(12) United States Patent  (10) Patent No.: US 6,676,308 B2
Baek  (45) Date of Patent: Jan. 13, 2004

(54) TRAFFIC ACCIDENT PHOTOGRAPHING DEVICE FOR A VEHICLE

(75) Inventor: Kyung-Il Baek, 314-207 Dukyun Maeul Youngnam Topsville Apt. 887-1 Junja-2-Dong, Changan-Gu, Suwon-Si, Kyunggi-Do (KR), 440-302

(73) Assignees: Kyung-Il Baek, Kyunggi-Do (KR); In-Sun Bae, Kyunggi-Do (KR)

(*) Notice: Subject to any disclaimer, the term of this patent is extended or adjusted under 35 U.S.C. 154(b) by 44 days.

(21) Appl. No.: 10/292,516

(22) Filed: Nov. 13, 2002

(65) Prior Publication Data
US 2003/0059217 A1 Mar. 27, 2003

Related U.S. Application Data

(63) Continuation of application No. PCT/KR02/00922, filed on May 17, 2002.

(30) Foreign Application Priority Data

May 18, 2001 (KR) .................................... 10-2001-27435
May 4, 2002 (KR) .................................... 20-2002-13704

(51) Int. Cl.$^7$ ............................................. G03B 17/00
(52) U.S. Cl. ...................................... 396/427; 348/148
(58) Field of Search ................................. 396/427, 419, 396/429, 21, 332, 351; 348/148

(56) References Cited

U.S. PATENT DOCUMENTS 2,202,138 A * 5/1940 Buckham ................... 396/323
2,430,595 A * 11/1947 Young ......................... 396/21
2,888,530 A * 5/1959 Horton ..................... 200/61.52
4,167,756 A * 9/1979 Smith ........................ 348/343
5,262,813 A * 11/1993 Scharton ..................... 396/502
5,455,625 A * 10/1995 Englander ................... 348/375
5,568,211 A * 10/1996 Bamford ..................... 396/429
5,596,382 A * 1/1997 Bamford ..................... 396/429
5,765,063 A * 6/1998 Fukuda et al. .............. 396/332
5,878,283 A * 3/1999 House et al. .................. 396/6
6,333,759 B1 * 12/2001 Mazzilli ..................... 348/148

FOREIGN PATENT DOCUMENTS

| JP | 6-96384 | 4/1994 |
| JP | 0 635 398 | 9/1994 |
| JP | 9-226635 | 9/1997 |

OTHER PUBLICATIONS

PCT/KR02/00922 International Search Report dated Sep. 4, 2002.

* cited by examiner

Primary Examiner—Russell Adams
Assistant Examiner—Michelle Nguyen
(74) Attorney, Agent, or Firm—Pennie & Edmonds LLP

(57) ABSTRACT

Disclosed is a traffic accident photographing device for a vehicle. The device comprises camera-fastening means for fastening a camera to the vehicle to allow the camera to photograph an actual scene upon occurrence of a collision; and shutter-pressing means for allowing a shutter of the camera fastened to the vehicle by the camera-fastening means, to be pressed by a weight member which is moved under action of inertia force generated by the collision.

11 Claims, 24 Drawing Sheets

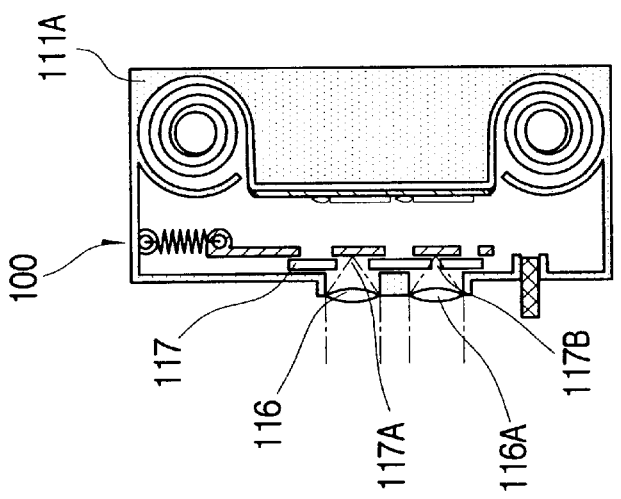
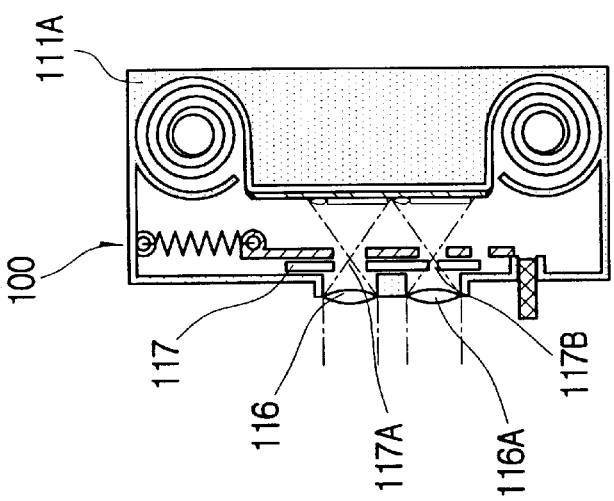
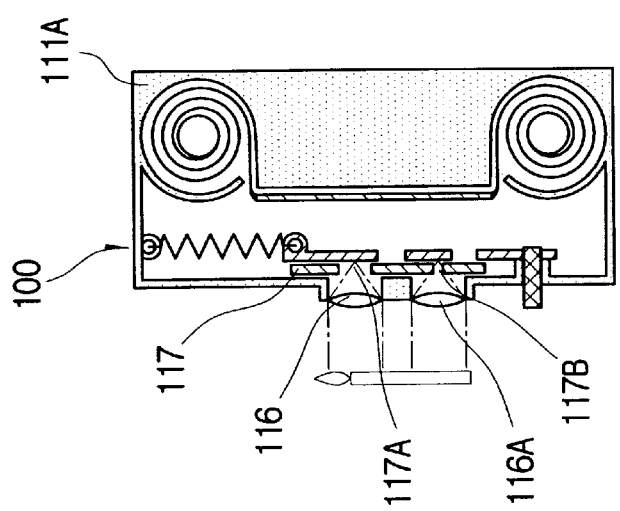

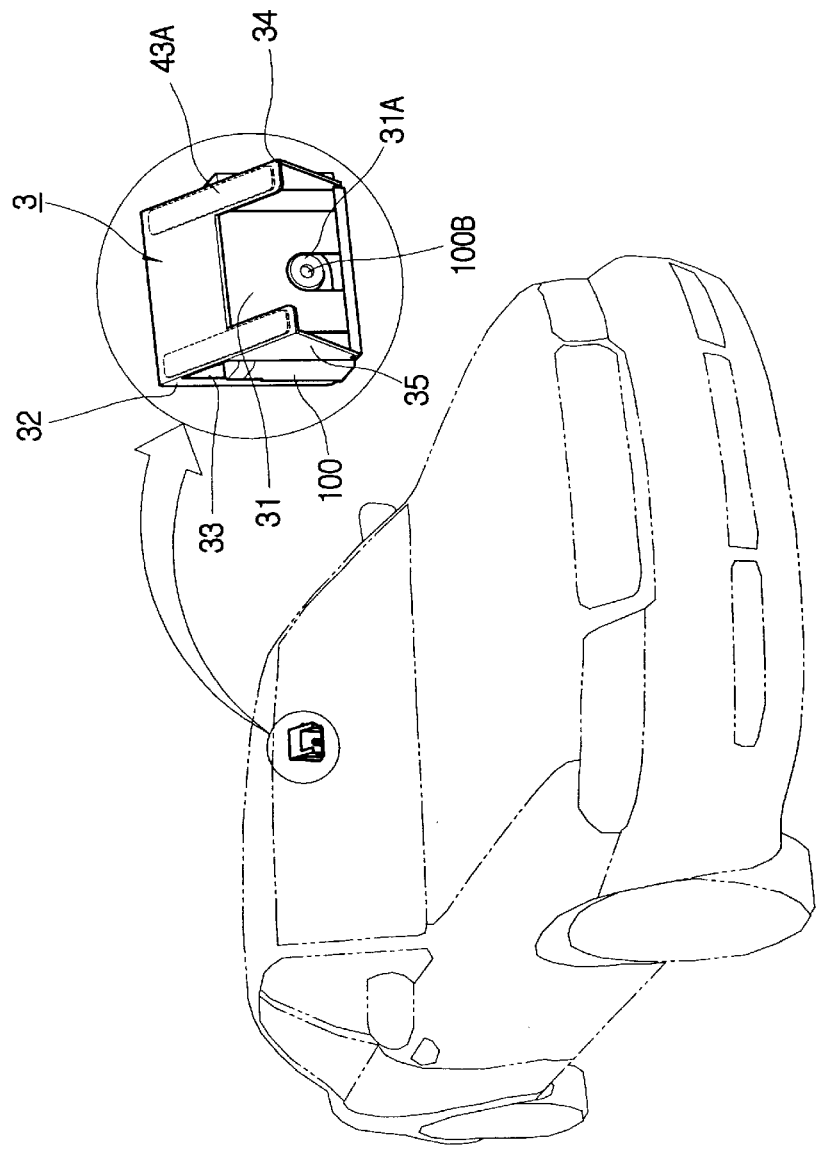

TRAFFIC ACCIDENT PHOTOGRAPHING DEVICE FOR A VEHICLE

This is a continuation of application No. PCT/KR02/00922 filed May 17, 2002.

TECHNICAL FIELD

The present invention relates to a traffic accident photographing device for a vehicle which is installed on the vehicle to photograph an actual scene simultaneously with occurrence of a collision, and more particularly, to a traffic accident photographing device for a vehicle which has a simple mechanical construction while capable of precisely photographing a traffic accident, thereby ensuring easy manufacture and securing economic efficiency.

BACKGROUND ART

As well known in the art, a traffic accident photographing device has a camera installed on the front or rear of a vehicle. The camera is configured in a manner such that it can be operated simultaneously with occurrence of a collision to photograph an actual scene. The photographed actual scene is utilized as corroborative facts when handling the traffic accident.

However, the conventional traffic accident photographing device suffers from defects in that, since its construction is complicated, the number of component parts is increased, and it is difficult to manufacture the device. Also, because costly equipment such as a digital camera or an analog camcoder and an electric element such as an acceleration sensor for allowing the camera to be operated simultaneously with occurrence of an accident are needed, as a manufacturing cost is increased, financial burden cannot but be incurred upon purchasing and installing the device. Further, due to the fact that the device is susceptible to mechanical shock and breakdown frequently occurs, financial burden is further increased, and operational preciseness and reliability are deteriorated. Moreover, by the fact that a bolt-locking hole must be made in the vehicle, as damage to a vehicle body is caused, persons tend to show reluctance to use the device.

DISCLOSURE OF THE INVENTION

Accordingly, the present invention has been made in an effort to solve the problems occurring in the related art, and an object of the present invention is to provide a traffic accident photographing device for a vehicle which has a simple mechanical construction while capable of precisely photographing an actual scene of a collision, thereby ensuring easy manufacture and securing economic efficiency.

Another object of the present invention is to provide a traffic accident photographing device for a vehicle which is configured to photograph front, rear, left and right side images of the vehicle, with a camera fastened to the roof of the vehicle.

Another object of the present invention is to provide a traffic accident photographing device for a vehicle which is configured to allow a camera shutter to be pressed irrespective of the direction in which a collision occurs.

Another object of the present invention is to provide a traffic accident photographing device for a vehicle which has a simple construction despite adopting an electric circuit structure, thereby capable of being manufactured at a reduced cost and precisely operated.

Another object of the present invention is to provide a traffic accident photographing device for a vehicle which allows front, rear, left and right side images of the vehicle to be photographed, without requiring an arrangement or component parts for directing the front, rear, left and right side images of the vehicle toward a lens of a camera fastened to the roof of the vehicle.

Another object of the present invention is to provide a traffic accident photographing device for a vehicle which can keep constant resolution of a photograph taken simultaneously with occurrence of a collision, irrespective of day or night.

Another object of the present invention is to provide a traffic accident photographing device for a vehicle which does not need component parts for fastening a camera to the roof of the vehicle or other separate component parts, in such a way as to simplify construction.

Still another object of the present invention is to provide a traffic accident photographing device for a vehicle which has a simple construction to be easily manufactured, can be mounted to the vehicle simply by bonding due to a light weight and a reduced volume, and can photograph an actual scene simultaneously with occurrence of a collision through a simple mechanical operating procedure, thereby further improving operational preciseness and reliability.

Yet still another object of the present invention is to provide a traffic accident photographing device for a vehicle which can automatically photograph an actual scene simultaneously with occurrence of a collision and at the same time allows manual photographing work to render user convenience.

In order to achieve the above objects, according to one aspect of the present invention, there is provided a traffic accident photographing device for a vehicle, comprising: camera-fastening means for fastening a camera to the vehicle to allow the camera to photograph an actual scene upon occurrence of a collision; and shutter-pressing means for allowing a shutter of the camera fastened to the vehicle by the camera-fastening means, to be pressed by a weight member which is moved under action of inertia force generated by the collision.

According to another aspect of the present invention, the camera-fastening means comprises a transparent cover bracket having a reflection mirror at a center portion thereof; a roof bracket bolted to the roof of the vehicle along with the transparent cover bracket; and a housing coupled to a lower surface of the roof bracket, and defined, at a center portion thereof, with a camera insertion space which is opened at an upper end, the housing being further defined with a lens exposure opening below the camera insertion space.

According to another aspect of the present invention, the shutter-pressing means comprises a weight member-mounting hole defined through a side wall of the housing to be communicated with the camera insertion space; a round bar-shaped weight member disposed in the weight member-mounting hole; and a spring for biasing the weight member outward of the weight member-mounting hole.

According to another aspect of the present invention, the shutter-pressing means comprises a circular groove defined on a part of an upper surface of the housing; a pressing rod-mounting hole defined through a side wall of the housing below the circular groove, to be communicated with the camera insertion space; a discus-shaped weight member and a round bar-shaped pressing rod disposed in the circular groove and the pressing rod-mounting hole, respectively, and connected with each other by a rope extending through a connection hole which communicates the circular groove with the pressing rod-mounting hole; and a spring for biasing the pressing rod outward of the pressing rod-mounting hole.

According to another aspect of the present invention, the shutter-pressing means comprises a rectangular groove defined on a part of an upper surface of the housing; a receiving groove defined on a part of a bottom surface of the rectangular groove, to be communicated with the camera insertion space; a rotary pressing member hingedly received in the receiving groove and having a forward projection and an upward projection; a rectangular weight member disposed in the rectangular groove, and defined, on a lower surface thereof, with an inclined contact surface to be brought into sliding contact with the upward projection of the rotary pressing member; and a plurality of tension springs having one ends connected to both lengthwise ends of the rectangular weight member and the other ends connected to side surfaces of the rectangular groove.

According to another aspect of the present invention, the shutter-pressing means comprises a solenoid-mounting hole defined through a side wall of the housing, to be communicated with the camera insertion space; and a solenoid disposed in the solenoid-mounting hole, and electrically connected with an impact switch and batteries which are received in a switch mounting groove and a battery mounting groove, respectively, defined at a side of the solenoid-mounting hole and opened at their upper ends, the impact switch comprising a hollow cylindrical body having plus and minus terminals, a spherical weight member supported by an elastic piece at a lower end thereof and in the hollow cylindrical body and serving as an electrode, and an electrode plate attached to a circumferential inner surface of the hollow cylindrical body at the same height as the spherical weight member.

According to another aspect of the present invention, the reflection mirror is formed by a mirror body having a truncated quadrangular pyramid-shaped contour.

According to another aspect of the present invention, the reflection mirror is formed by a mirror body having a truncated cone-shaped contour.

According to another aspect of the present invention, the reflection mirror is formed by a mirror body having a contour of a triangle which is opened at a base thereof and has both sides symmetrized with each other.

According to another aspect of the present invention, the camera comprises a camera body having four side walls; camera lenses are attached to the four side walls, respectively, of the camera body; film-supporting surfaces are continuously formed inward of the camera lenses; and a film-supplying roll and a film-winding roll are provided inward of the film-supporting surfaces in a manner such that film can be supplied from the film-supplying roll along the film-supporting surfaces and thereafter wound around the film-winding roll.

According to another aspect of the present invention, the camera comprises a camera body and first and second camera lenses installed on a front wall of the camera body; and an iris having first and second iris holes of different diameters is positioned behind the first and second camera lenses.

According to another aspect of the present invention, the camera-fastening means comprises fastening projections integrally formed on both side walls of the camera and defined with bolt-locking holes; the shutter-pressing means comprises a weight member movably disposed at a side of the camera, the weight member having a weight body and a bent portion which is integrally formed at an upper end of the weight body and connected to the camera shutter; and a transparent cover having a reflection mirror is positioned in front of a camera lens.

According to another aspect of the present invention, the camera-fastening means comprises a camera holder; and the camera holder has a front plate defined with a lens exposure opening, a rear plate positioned behind the front plate and extending in a vertical direction in a manner such that a camera insertion space opened at a lower end thereof is defined between the front and rear plates, and a pair of attachment plates integrally formed on an upper surface and at both sides of the front plate and each having an inclination angle corresponding to that of a front windshield glass.

According to another aspect of the present invention, the attachment plates of the camera holder are supported by a pair of vertical support plates, respectively, which are secured at their one ends to the front plate; and the opening of the camera insertion space can be opened and closed by a cover plate having one end which is hingedly coupled to the vertical support plates and the other end which has a fastening protrusion capable of being engaged with an engaging protrusion formed on a rear surface of and adjacent to a lower end of the rear plate.

According to still another aspect of the present invention, the shutter-pressing means comprises a weight member which is defined with an insertion hole at a center portion thereof in a manner such that the weight member can be fitted around the shutter of the camera; and the shutter is formed with a truncated cone-shaped portion, and an inner edge of the weight member, defining the insertion hole, is formed, adjacent to a lower end thereof, with a contact surface which is flared downward, in a manner such that the shutter of the camera can be pressed by the weight member.

According to yet still another aspect of the present invention, an upper end of the camera shutter is extended upward to form a contact projection; and a closure member placed on the weight member fitted around the camera shutter has an auxiliary shutter which is to be brought into contact with the contact projection and has a predetermined elasticity.

BRIEF DESCRIPTION OF THE DRAWINGS

The above objects, and other features and advantages of the present invention will become more apparent after a reading of the following detailed description when taken in conjunction with the drawings, in which:

FIGS. 1 through 5c show a first embodiment of the present invention, wherein FIG. 1 is an exploded perspective view illustrating an entire construction of the present invention, FIG. 2 is an exploded perspective view illustrating a state in which room lights are added to FIG. 1, and FIG. 3 is an exploded perspective view illustrating the room lights and brake lights are added to FIG. 1;

FIGS. 4a and 4b show operational statuses of the first embodiment of the present invention, wherein FIG. 4a illustrates a state before operation, and FIG. 4b illustrates a state after operation;

FIGS. 5a through 5c are perspective views respectively illustrating contours of reflection mirrors according to the present invention;

FIGS. 6a through 6c show a second embodiment of the present invention, wherein FIG. 6a is an exploded perspective view, FIG. 6b is a cross-sectional view illustrating a state before operation, and FIG. 6c is a cross-sectional view illustrating an operating state;

FIGS. 7a through 7c show a third embodiment of the present invention, wherein FIG. 7a is an exploded perspective view, FIG. 7b is a cross-sectional view illustrating a state before operation, and FIG. 7c is a cross-sectional view illustrating an operating state;

FIGS. 8 through 9b show a fourth embodiment of the present invention, wherein FIG. 8 is an exploded perspective view, FIG. 9b is a partially broken-away perspective view illustrating an operating state of the impact switch;

FIGS. 10a and 10b show a fifth embodiment of the present invention, wherein FIG. 10a is a perspective view, and FIG. 10b is a cross-sectional view illustrating an inner structure;

FIGS. 11a through 11d show a sixth embodiment of the present invention, wherein FIG. 11a is a perspective view, FIG. 11b is a cross-sectional view illustrating an inner structure, and FIGS. 11c and 11d are cross-sectional views illustrating operational statuses;

FIGS. 13 through 19b show an eighth embodiment of the present invention, wherein FIG. 13 is a perspective view illustrating a vehicle on which the present invention is installed;

FIGS. 14a and 14b show a construction of the present invention, wherein FIG. 14a is a front perspective view, and FIG. 14b is a front perspective view illustrating a state in which a camera is inserted;

FIGS. 16a and 16b show a state in which a weight member of the present invention is positioned in place, wherein FIG. 16a is a front exploded perspective view, and FIG. 16b is a rear exploded perspective view;

FIGS. 17a and 17b show the state in which the weight member of the present invention is positioned in place, wherein FIG. 17a is a transverse cross-sectional view, and FIG. 17b is a longitudinal cross-sectional view; and FIGS. 18a through 19b show a state in which the weight member of the present invention is operated, wherein FIGS. 18a and 18b are respectively a transverse cross-sectional view and a longitudinal cross-sectional view illustrating a state before operation, and FIGS. 19a and 19b are respectively a transverse cross-sectional view and a longitudinal cross-sectional view illustrating an operating state.

BEST MODE FOR CARRYING OUT THE INVENTION

Figure 1:
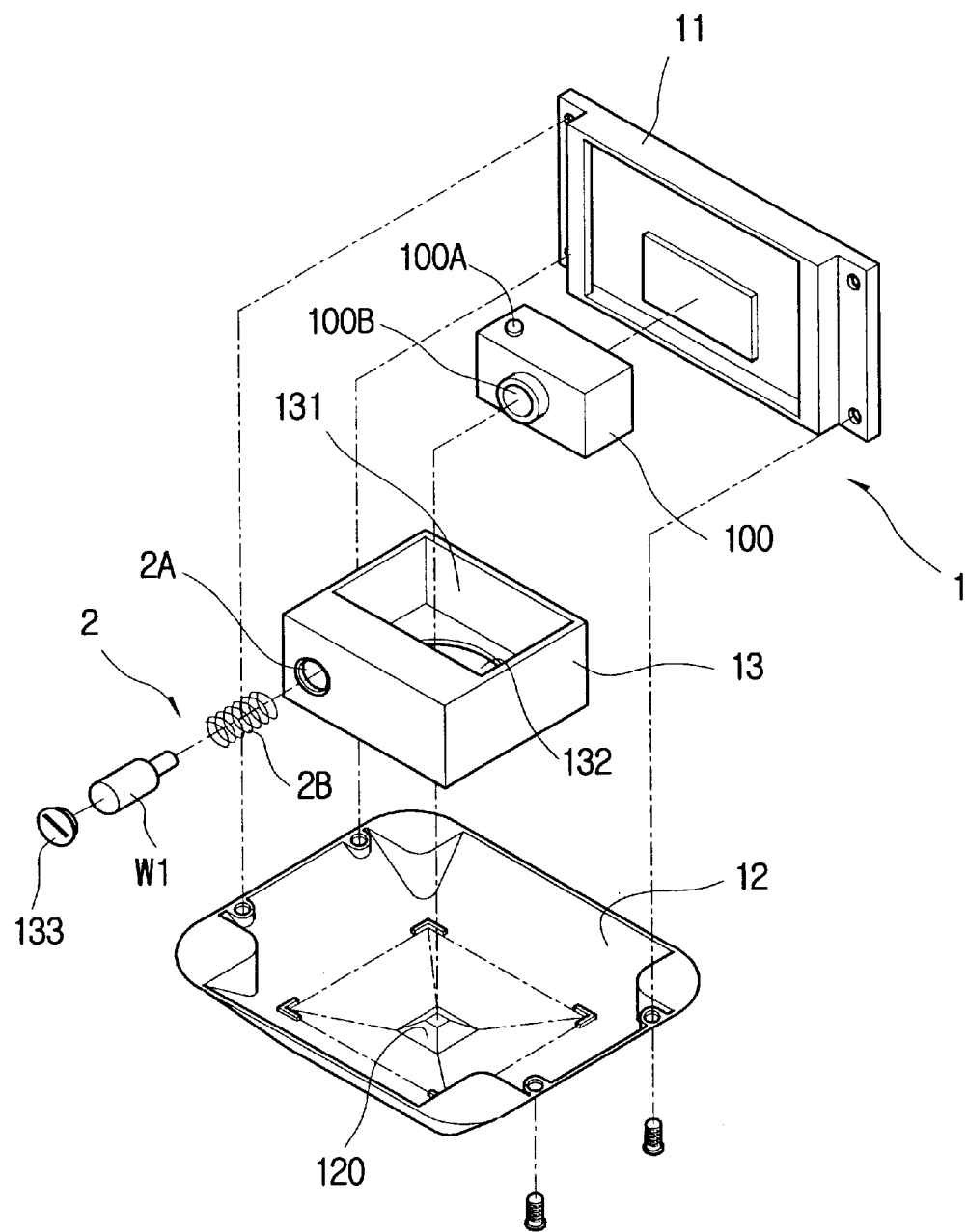

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a roof attachment type traffic accident photographing device for a vehicle in accordance with a first embodiment of the present invention, in which a camera is fastened to the roof inside the vehicle.

The traffic accident photographing device 1 comprises a housing 13 having a box-shaped contour. The housing 13 is defined with a camera insertion space 131 which is opened at an upper end thereof. Below the camera insertion space 131, the housing 13 is also defined with a lens exposure opening 132 in a manner such that a camera 100 can be inserted into the camera insertion space 131, with a lens 100B facing downward.

A plate-shaped roof bracket 11 is provided on the housing 13. At this time, the roof bracket 11 and the housing 13 are detachably coupled to each other by conventional coupling means. Both ends of the roof bracket 11 are locked to the roof of the vehicle by bolts, along with a cover bracket 12 which is provided underneath the housing 13.

Figure 5A:
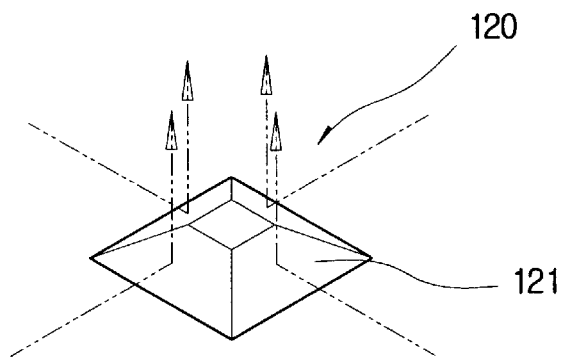
Figure 5B:
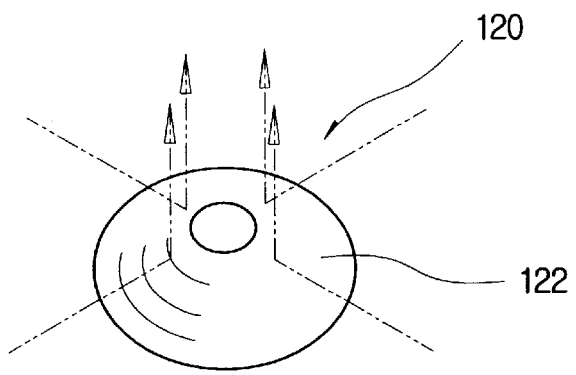
Figure 5C:
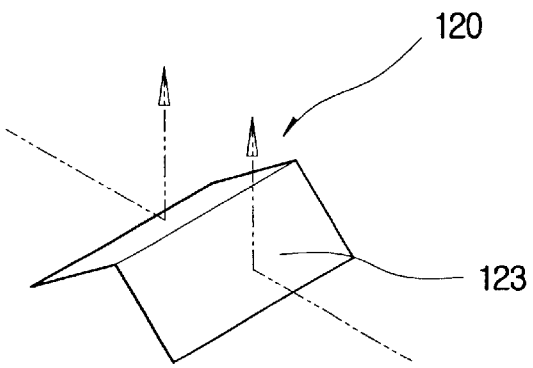

Also, a center portion of the cover bracket 12 is provided with a reflection mirror 120 which allows front, rear, left and right images of the vehicle to be incident on the lens 100B of the camera 100. The reflection mirror 120 can be formed by a mirror body 121 having a truncated quadrangular pyramid-shaped contour as shown in FIG. 5a, a mirror body 122 having a truncated cone-shaped contour as shown in FIG. 5b, or a mirror body 123 having a contour of a triangle as shown in FIG. 5c, which is opened at a base thereof and has both sides symmetrized with each other.

In unison with this, shutter-pressing means 2 is provided so that a shutter 100A of the camera accommodated in the housing 13 can be pressed upon occurrence of a collision. The shutter-pressing means comprises a weight member-mounting hole 2A horizontally defined through a side wall of the housing 13 to be communicated with the camera insertion space 131, a round bar-shaped weight member W1 disposed in the weight member-mounting hole 2A, and a spring 2B for biasing the weight member W1 outward in the weight member-mounting hole 2A. At this time, the weight member-mounting hole 2A is defined at the same height as the shutter 100A of the camera 100 accommodated in the housing 13. The unexplained reference numeral 133 designates a plug threadedly coupled into the weight member-mounting hole 2A.

Figure 2:
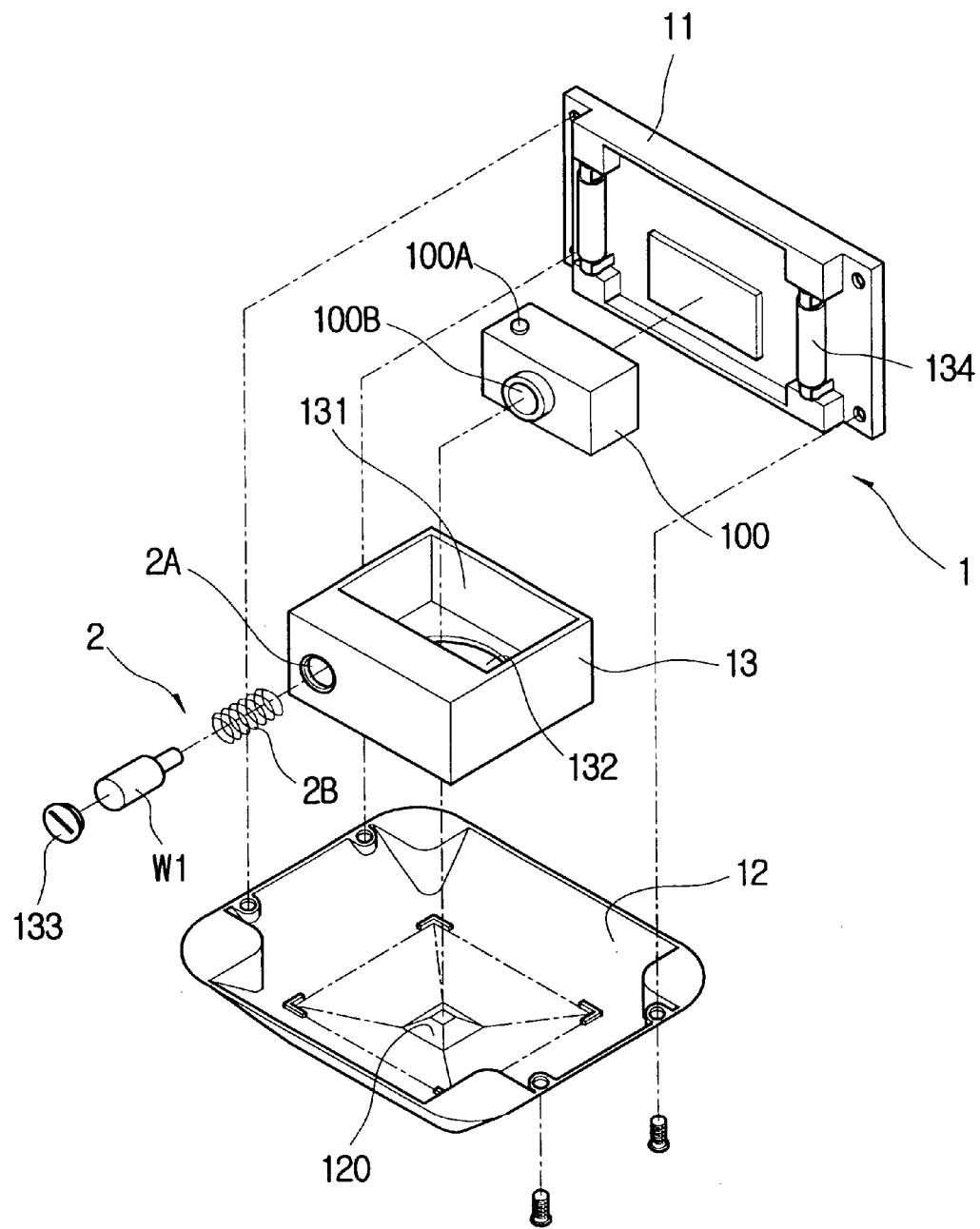
Figure 3:
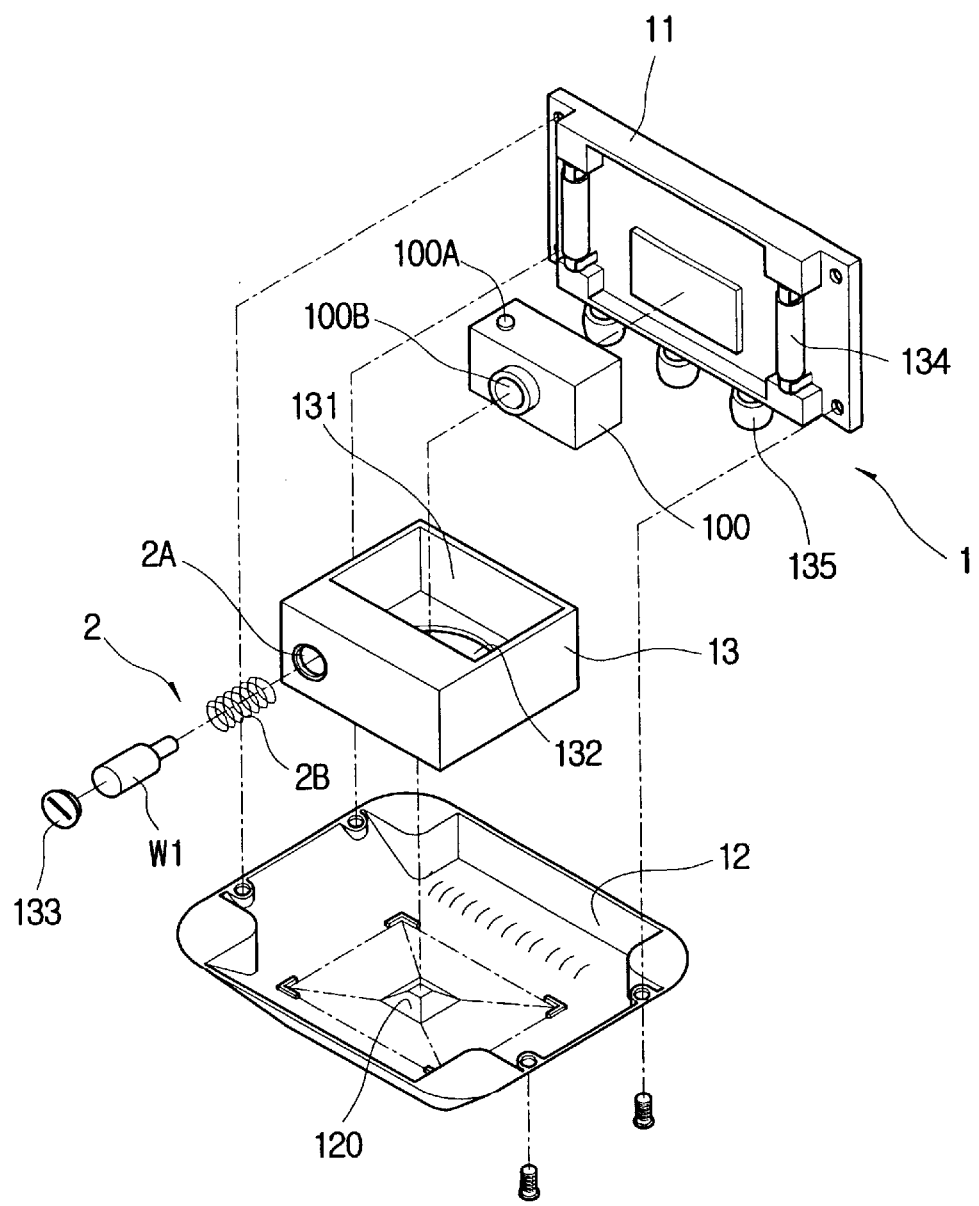

Meanwhile, as shown in FIG. 2, room lights 134 may be provided at both sides of the roof bracket 11, and as shown in FIG. 3, in addition to the room lights 134, brake lights 135 may be provided to the roof bracket 11.

Figure 4A:
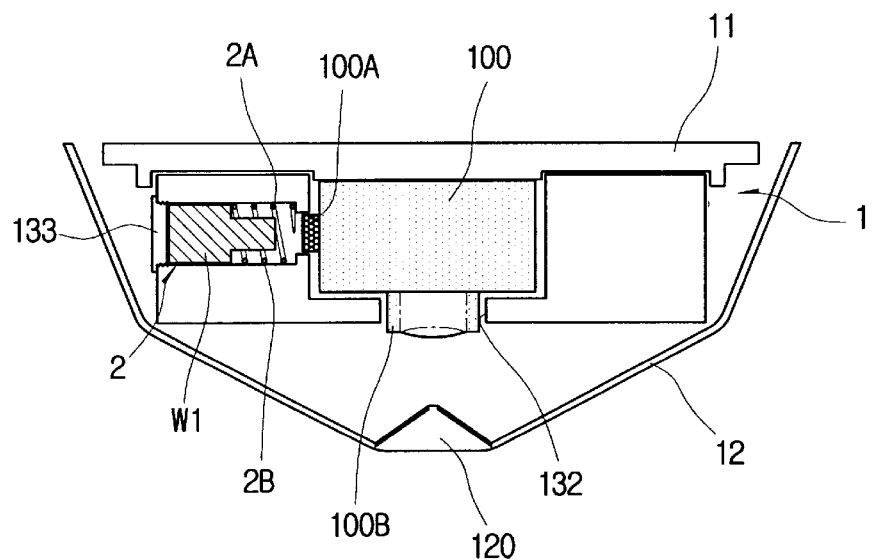
Figure 4B:
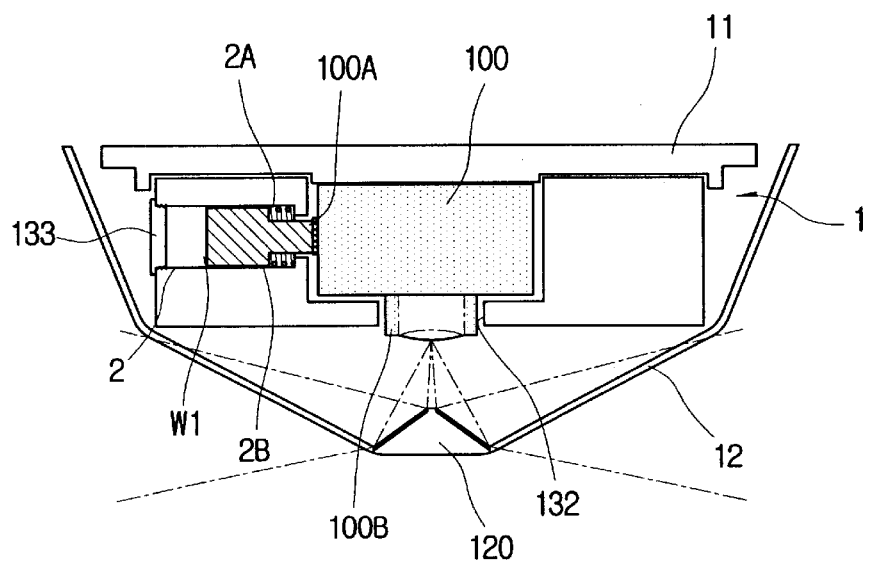

FIGS. 4a and 4b show operational statuses of the first embodiment of the present invention, wherein FIG. 4a illustrates a state before operation, and FIG. 4b illustrates a state after operation.

While the vehicle travels as usual, as shown in FIG. 4a, the weight member W1 is held at its original position by the spring 2B. In this state, if a collision occurs, as shown in FIG. 4b, the weight member W1 is moved forward under action of inertia force while overcoming elastic force of the spring 2B, to press the shutter 100A of the camera 100 accommodated in the camera insertion space 131 of the housing 13, so that an actual scene of a traffic accident can be photographed. At this time, since the front, rear, left and right images of the vehicle are incident on the lens 100B of the camera 100, it is possible to photograph the actual scene irrespective of the direction in which a collision occurs, due to the presence of the reflection mirror 120 provided to the transparent cover bracket 12.

Figure 6A:
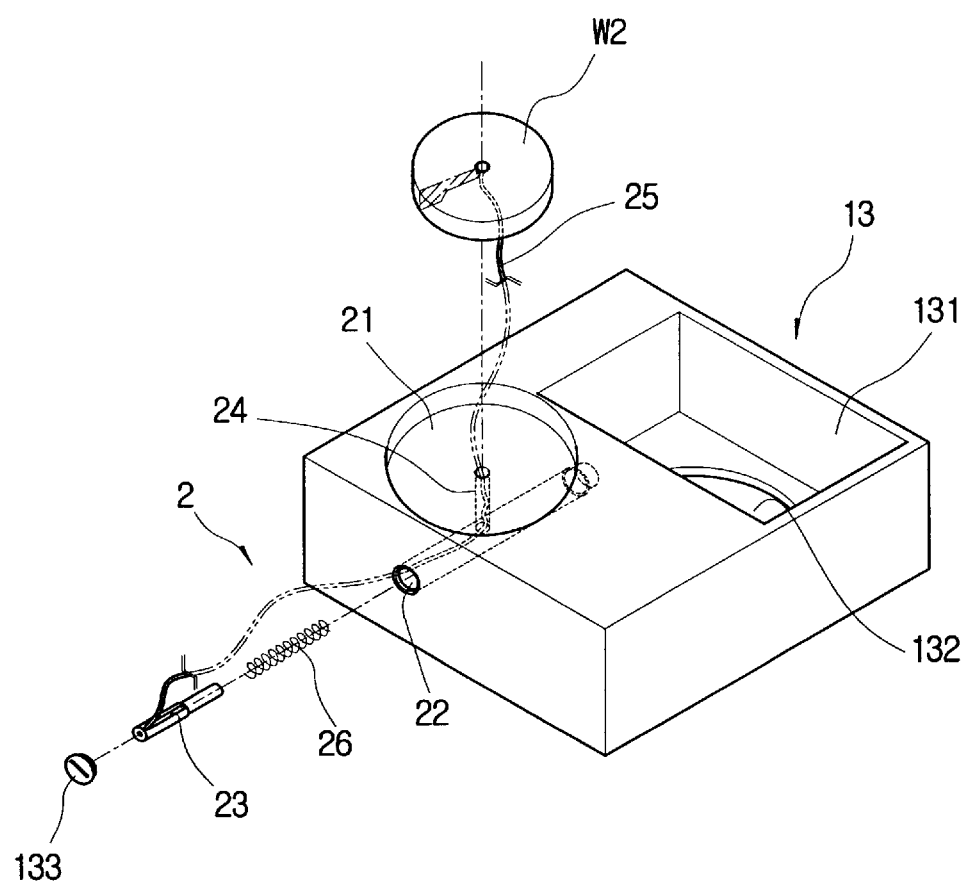
Figure 6B:
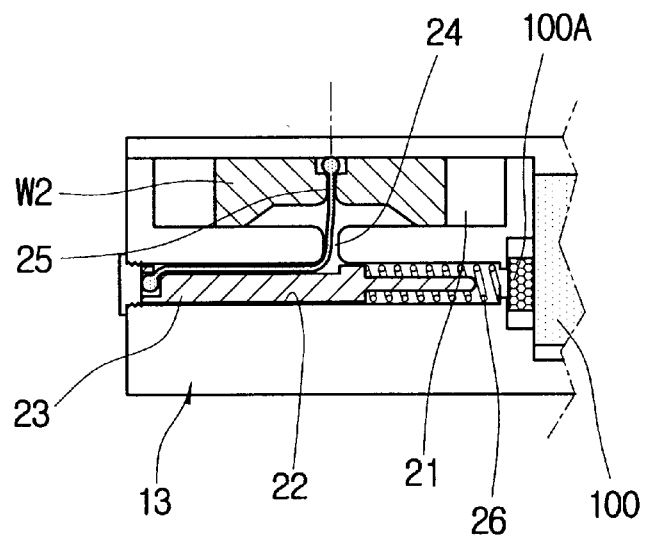
Figure 6C:
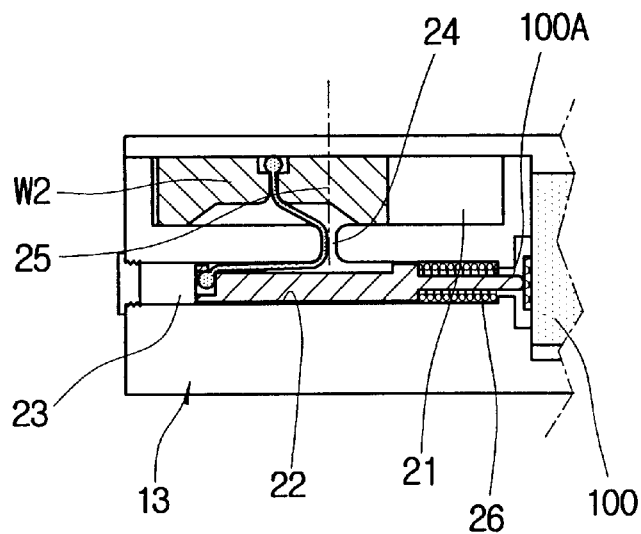

FIGS. 6a through 6c show a second embodiment of the present invention. In this embodiment, as shown in FIG. 6a, in order to constitute the shutter-pressing means 2, a circular groove 21 is defined on an upper surface of the housing 13 at a side of the camera insertion space 131, and a pressing rod-mounting hole 22 is horizontally defined through a side wall of the housing 13 below the circular groove 21, to be communicated with the camera insertion space 131. The circular groove 21 and the pressing rod-mounting hole 22 are communicated with each other by a connection hole 24 extending in a vertical direction. A discus-shaped weight member W2 is disposed in the circular groove 21, and a round bar-shaped pressing rod 23 is disposed in the pressing rod-mounting hole 22 in a state wherein the pressing rod 23 is elastically supported by a spring 26.

The weight member W2 and the pressing rod 23 are connected with each other by a rope 25 extending through the connection hole 24, so that they operatively cooperate with each other. Here, the unexplained reference numeral 132 designates a lens exposure opening, and 133 a plug.

In the second embodiment of the present invention, constructed as mentioned above, while the vehicle travel as usual, as shown in FIG. 6b, the weight member W2 is held at its original position by i s own weight, and the pressing rod 23 is held at its original position by elastic force of the spring 26.

In this state, if a collision occurs, the weight member W2 is horizontally moved in the circular groove 21 under action of inertia force, by which pulling force is applied to the pressing rod 23 via the rope 25. By the pulling force, as the pressing rod 23 presses the shutter 100A of the camera 100 as shown in FIG. 6c while overcoming the elastic force of the spring 26, an actual scene of a traffic accident can be photographed.

Figure 7A:
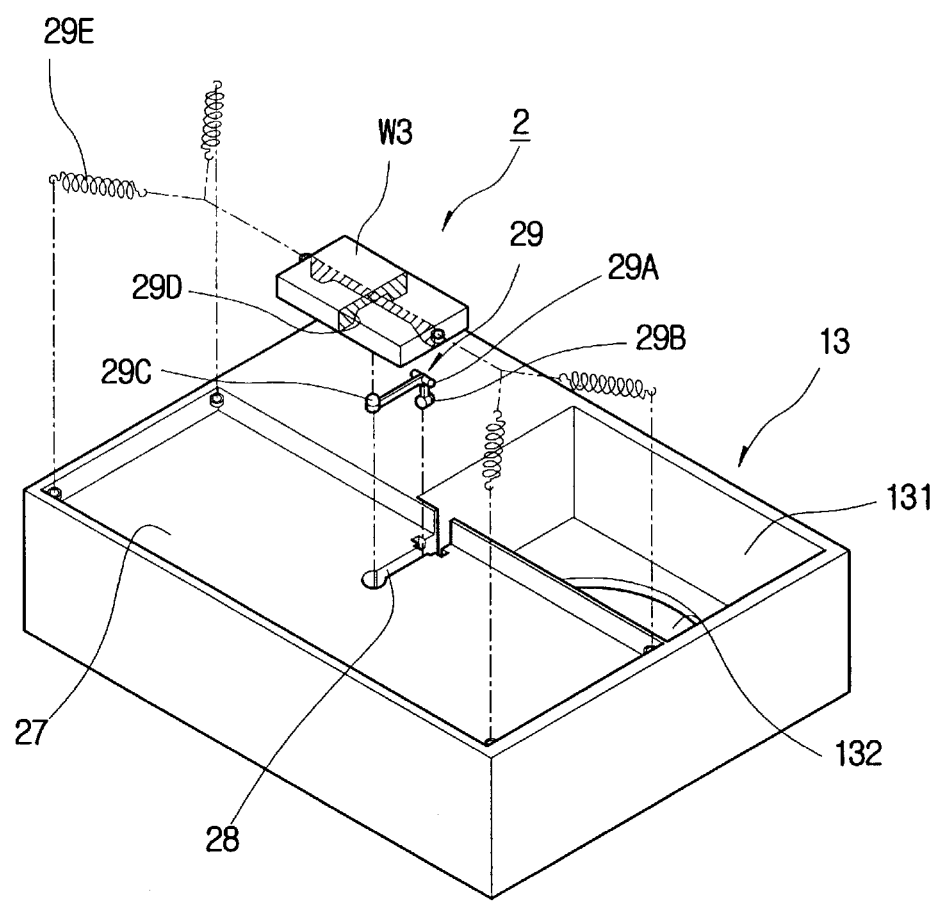
Figure 7B:
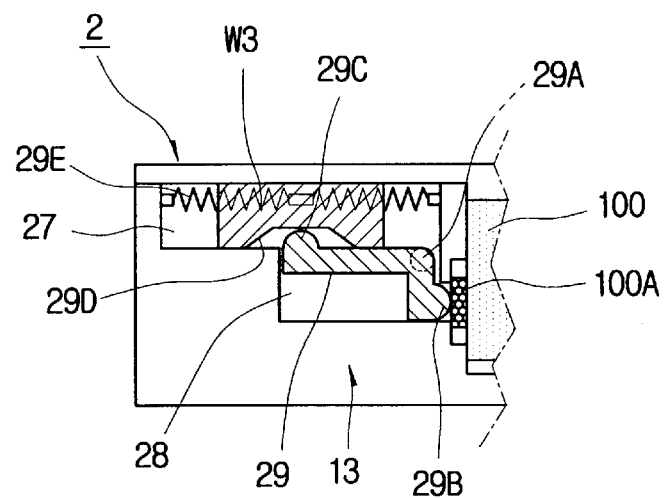
Figure 7C:
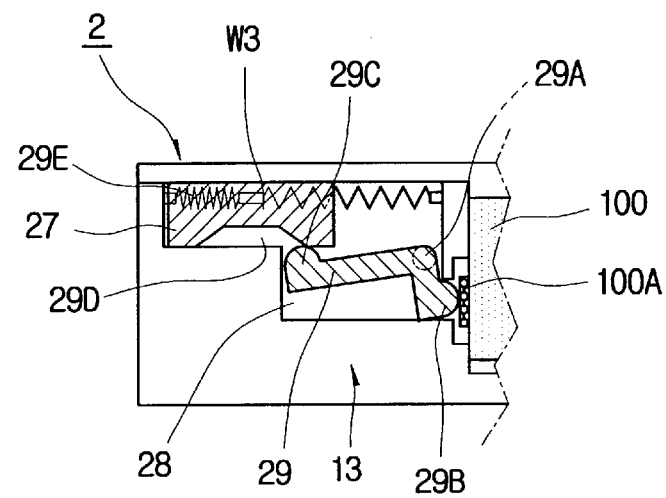

FIGS. 7a through 7c show a third embodiment of the present invention. In this embodiment, as shown in FIG. 7a, in order to constitute the shutter-pressing means 2, a rectangular groove 27 is defined on an upper surface of the housing 13 at a side of the camera insertion space 131, and a receiving groove 28 is defined on a part of a bottom surface of the rectangular groove 27, to communicate the rectangular groove 27 and the camera insertion space 131 with each other. A rotary pressing member 29 is installed in the receiving groove 28 by a hinge 29A so that the rotary pressing member 29 can be rotated forward and backward about the hinge 29A.

A rectangular weight member W3 is disposed in the rectangular groove 27, and defined, on a lower surface thereof, with an inclined contact surface 29D. The rectangular weight member W3 is elastically supported by a plurality of tension springs 29E. The tension springs 29E have one ends connected to both lengthwise ends of the rectangular weight member W3 and the other ends connected to side surfaces of the rectangular groove 27.

The rotary pressing member 29 has a forward projection 29B which can directly press the shutter 100A of the camera 100 accommodated in the camera insertion space 131 of the housing 13 and an upward projection 29C which is formed at a rear end of the rotary pressing member 29 to be brought into contact with the inclined contact surface 29D of the weight member W3.

In the third embodiment of the present invention, constructed as mentioned above, while the vehicle travels as usual, as shown in FIG. 7b the weight member W3 is held at its original position by the tension springs 29E. In this state, if a collision occurs, the weight member W3 is moved in its position while overcoming the elastic force of the tension springs 29E. At this time, as shown in FIG. 7c, as the inclined contact surface 29D of the weight member W3 is brought into contact with the upper projection 29C of the rotary pressing member 29, the rotary pressing member 29 is rotated about the hinge 29A. By this fact, as the forward projection 29B of the rotary pressing member 29 presses the shutter 100A of the camera 100, an actual scene of a traffic accident can be photographed simultaneously with occurrence of the collision.

Figure 8:
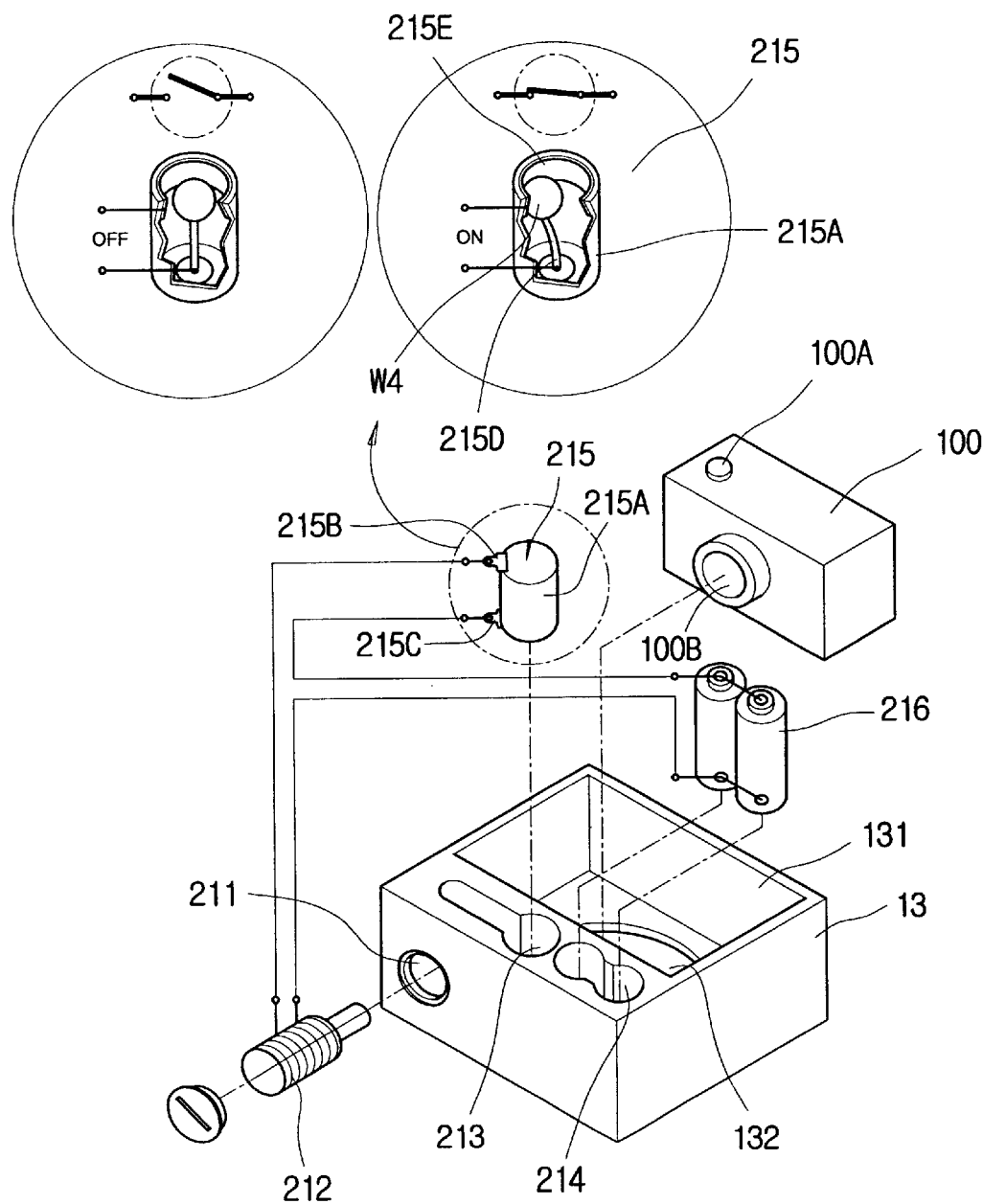
Figure 9A:
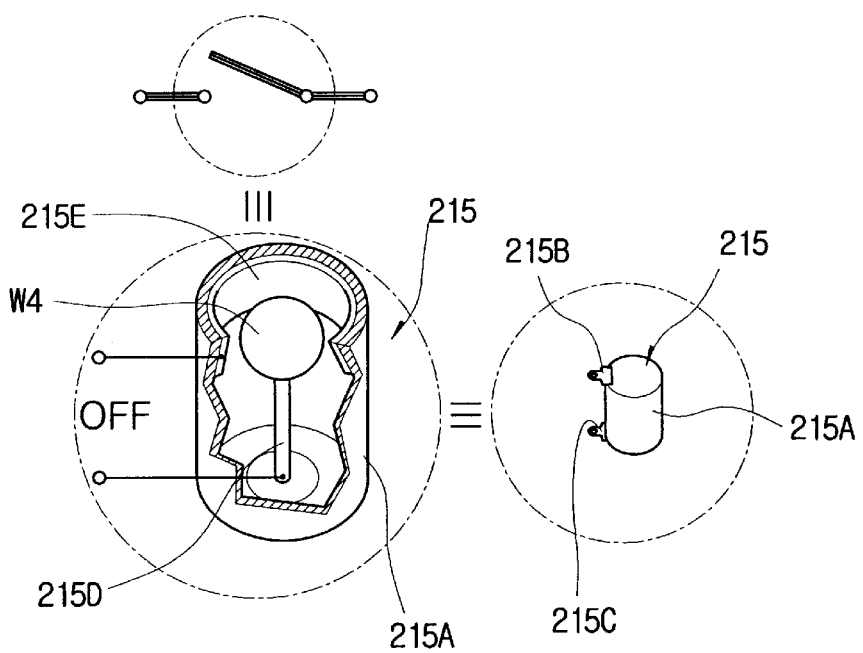
FIG. 9a is a partially broken-away perspective view illustrating a state of an impact switch before operation.
Figure 9B:
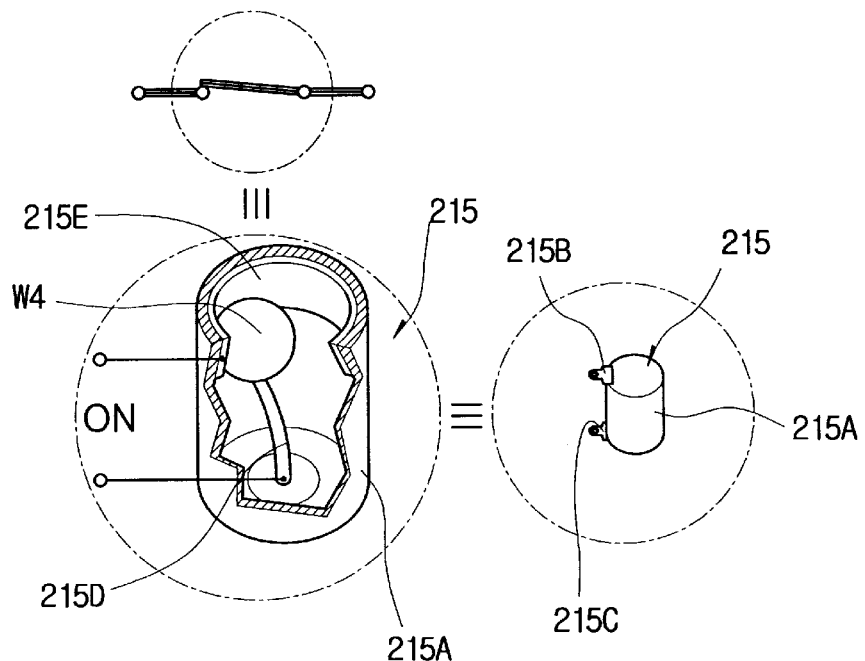

FIGS. 8 through 9b show a fourth embodiment of the present invention. In this embodiment, as shown in FIG. 8, in order to constitute the shutter-pressing means 2, a solenoid-mounting hole 211 is defined at a side of the camera insertion space 131 through a side wall of the housing 13, to be communicated with the camera insertion space 131. A switch-mounting groove 213 and a battery-mounting groove 214 are defined in the housing 13 above the solenoid-mounting hole 211, in a manner such that an impact switch 215 having plus and minus terminals 215B and 215C is received in the switch-mounting groove 213 and batteries 261 are received in the battery-mounting groove 214.

A solenoid 212 is disposed in the solenoid-mounting hole 211 in a manner such that a rod portion of the solenoid 212 is moved forward by application of electric power to the solenoid 212 to press the shutter 100A of the camera 100 accommodated in the camera insertion space 131 of the housing 13. To this end, the solenoid 212 is electrically connected with the impact switch 215 and the batteries 216.

The impact switch 215 comprises a hollow cylindrical body 215A, a spherical weight member W4, and an electrode plate 215E. The spherical weight member W4 is supported by a freely bendable elastic piece 215D at a lower end thereof and in the hollow cylindrical body, to serve as an electrode. The electrode plate 215E is attached to a circumferential inner surface of the hollow cylindrical body 215A at the same height as the spherical weight member W4. The weight member W4 and the electrode plate 215E are connected with the plus and minus terminals 215B and 215C, respectively, of the hollow cylindrical body 215A.

In the fourth embodiment of the present invention, constructed as mentioned above, while the vehicle travels as usual, as shown in FIG. 9a, the weight member W4 supported by the elastic piece 215D at the lower end thereof is held separated from the electrode plate 215E attached to the inner surface of the hollow cylindrical body 215A, that is, in an opened state. In this state, if a collision occurs, as the weight member W4 of the impact switch 215 is bent while overcoming the elastic force of the elastic piece 215D, the weight member W4 is brought into contact with the electrode plate 215E. By this fact, an electrical signal is transmitted through the plus and minus terminals 215B and 215C of the hollow cylindrical body 215A to the solenoid 212 (see FIG. 8). Then, as the solenoid 212 is actuated by the electrical signal, the rod portion of the solenoid 212 presses the shutter 100A of the camera 100, whereby an actual scene of a traffic accident can be photographed simultaneously with occurrence of the collision.

Figure 10A:
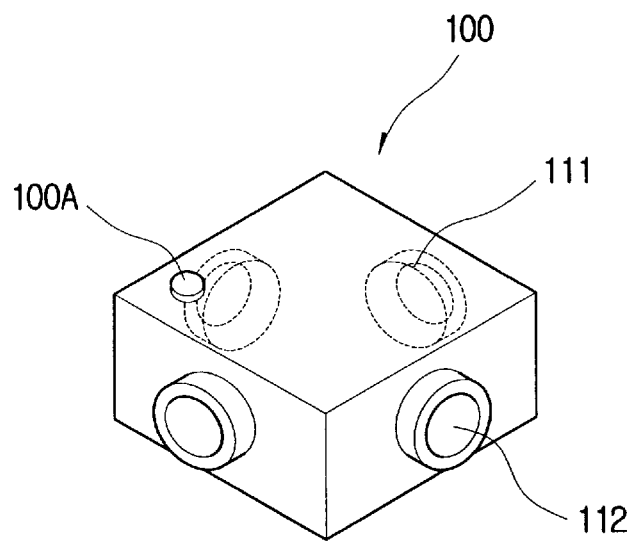
Figure 10B:
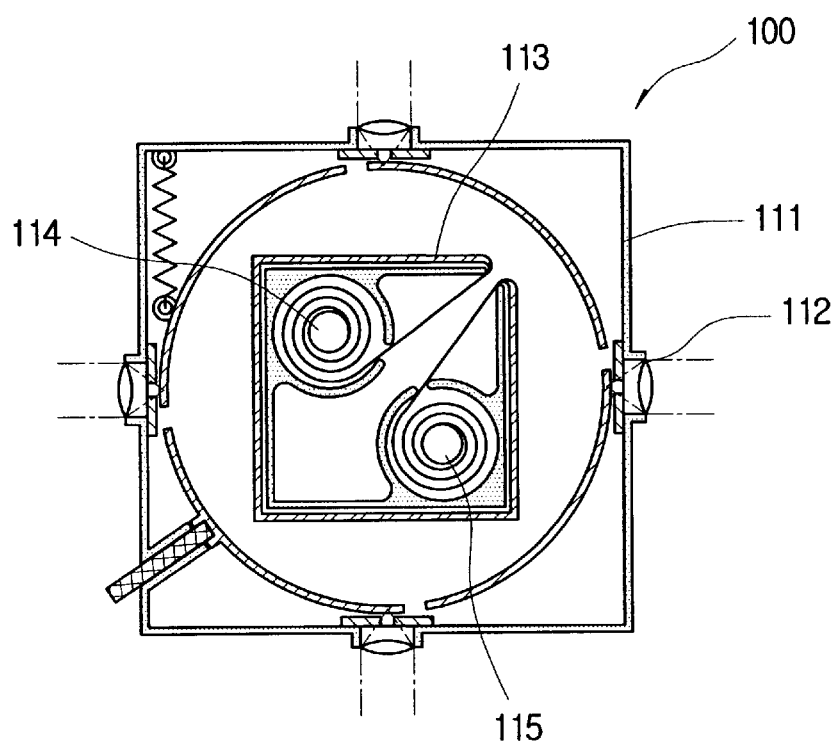

FIGS. 10a and 10b show a fifth embodiment of the present invention. In this embodiment, as shown in FIG. 10a, a camera body 111 has front, rear, left and right side walls and possesses a box-shaped contour. Four camera lenses 112 are attached to the four side walls, respectively, of the camera body 111. The lenses 112 are configured to be operated simultaneously with pressing of the shutter 100A.

Inside the camera body 111, as shown in FIG. 10b, film-supporting surfaces 113 are continuously formed inward of the camera lenses 112 to define a substantially square configuration. A film-supplying roll 114 and a film-winding roll 115 are provided inward of the film-supporting surfaces 113 in a manner such that film can be supplied from the film-supplying roll 114 along the film-supporting surfaces 113 and thereafter wound around the film-winding roll 115.

In the fifth embodiment of the present invention, constructed as mentioned above, by pressing the shutter 100A, as an iris having a circular contour is rotated, exposure is effected through holes defined in the iris, whereby photographing is executed so that images are formed on the film supported by the film-supporting surfaces 113. After the photographing is executed, the film is supplied and collected by one cut, and the iris returns to its original position by a spring.

Figure 11A:
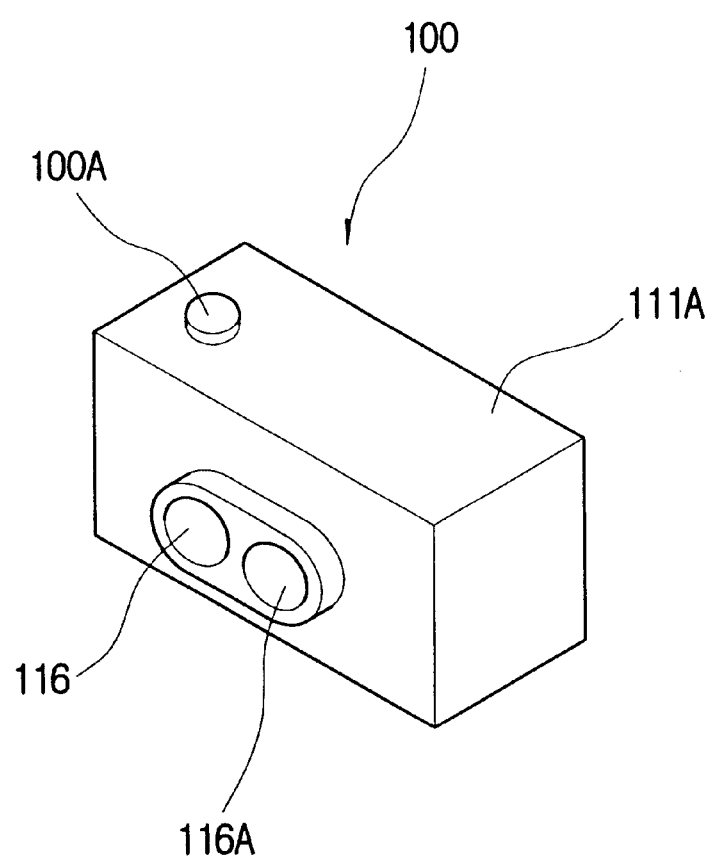

FIGS. 11*a* through 11*d* show a sixth embodiment of the present invention. In this embodiment, as shown in FIG. 11*a*, first and second camera lenses 116 and 116A are installed on a front wall of the camera body 111A having a rectangular box-shaped contour. The first and second camera lenses 116 and 116A are configured to be operated simultaneously with pressing of the shutter 100A.

Further, as shown in FIG. 11*b*, an iris 117 elastically supported by a spring is positioned behind the first and second camera lenses 116 and 116A inside the camera body 111A. The iris 117 is defined with first and second iris holes 117A and 117B having different diameters, in a manner such that the first and second iris holes 117A and 117B concentrically aligned with the first and second camera lenses 116 and 116A, respectively. The iris hole 117B of a small diameter allows photographing to be easily executed in the daytime, and the iris hole 117A of a large diameter allows photographing to be easily executed in the nighttime. Here, FIGS. 11*c* and 11*d* are cross-sectional views illustrating operational statuses.

Figure 12:
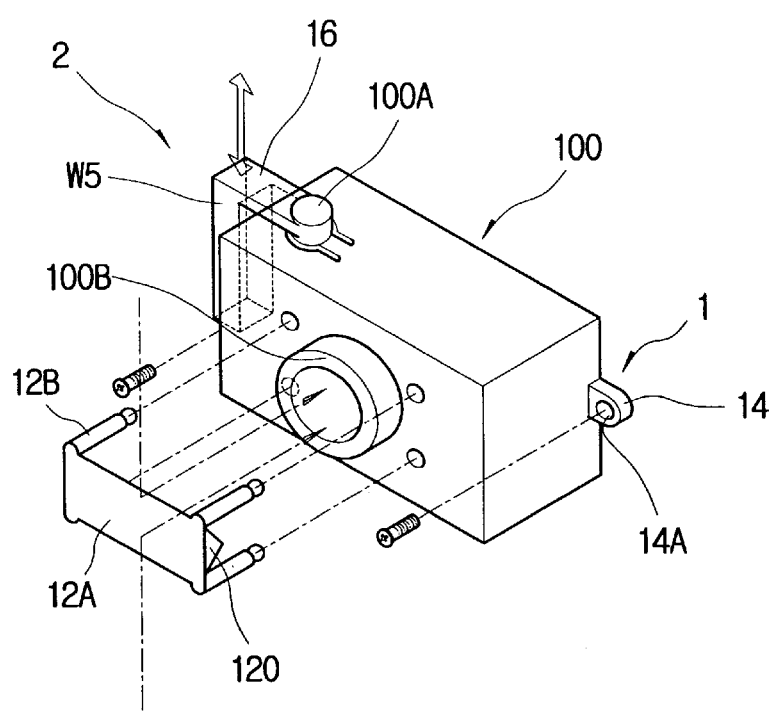
FIG. 12 is a perspective view illustrating a seventh embodiment of the present invention.

FIG. 12 is a perspective view illustrating a seventh embodiment of the present invention. In this embodiment, fastening projections 14 each having a bolt-locking hole 14A are integrally formed on both side walls of the camera 100 to constitute the camera-fastening means 1, so that the camera 100 can be directly bolted to the roof of the vehicle without using separate fittings. The shutter-pressing means 2 comprises a weight member W5. The weight member W5 is vertically movably disposed at a side of the camera 100. The weight member W5 has a weight body and a bent portion 16 which is integrally formed at an upper end of the weight body and connected to the shutter 100A of the camera 100.

A guide cover 12A having attached thereto a reflection mirror 120 for directing side images toward the lens 100B of the camera 100 is positioned in front of the camera 100. A plurality of legs 12B parallel extending one to another in the same direction are coupled to the camera 100, and thereby, the guide cover 12A can be held at a predetermined separation from the camera 100.

In the seventh embodiment of the present invention, constructed as mentioned above, upon occurrence of a collision, as the weight member W5 connected to the shutter 100A of the camera 100 via the bent portion 16 which is formed at the upper end of the weight member W5 is moved forward and rearward under action of inertia force, the shutter 100A is pressed by the weight member W5 to photograph an actual scene of a traffic accident. Also, due to the presence of the reflection mirror 120 of the guide cover 12A, side images can be incident on the lens 100B of the camera 100.

FIGS. 13 through 19*b* show an eighth embodiment of the present invention, wherein FIG. 13 is a perspective view illustrating a vehicle on which the present invention is installed.

As shown in these drawings, in this eights embodiment of the present invention, a camera holder 3 constituting the camera fastening means is attached and fastened to a front windshield glass of the vehicle. The camera 100 is accommodated in the camera holder 3 so that the lens 100B of the camera 100 is exposed forward of the vehicle.

Concretely describing this with reference to a partially enlarged part of FIG. 13, the camera holder 3 is formed by an injection-molding process and has a front plate 31. A pair of attachment plates 34 are formed on an upper surface of and at both sides, respectively, of the front plate 31. A lens exposure opening 31A is defined adjacent to a lower end of the front plate 31. The attachment plates 34 are supported by a pair of vertical support plates 35, respectively, which are secured at their one ends to the front plate 31.

A pair of double-sided adhesive tapes 43A are adhered to upper surfaces, respectively, of the attachment plates 34. By the double-sided adhesive tapes 43A, the camera holder 3 is adhesively attached to the front windshield glass of the vehicle. A rear plate 32 extending in a vertical direction is positioned behind the front plate 31 in a manner such that a camera insertion space 33 having an opening 33A at a lower end thereof is defined between the front and rear plates 31 and 32.

It is preferred that the camera 100 inserted and accommodated in the camera insertion space 33 comprises a conventional disposable camera in consideration of weight and disposable use. In the case of employing the disposable camera, it is possible to obtain sufficient fastening and supporting force simply by fitting the disposable camera into the camera insertion space 33 of the camera holder 3 which has a predetermined elasticity because it is injection-molded.

Figure 14A:
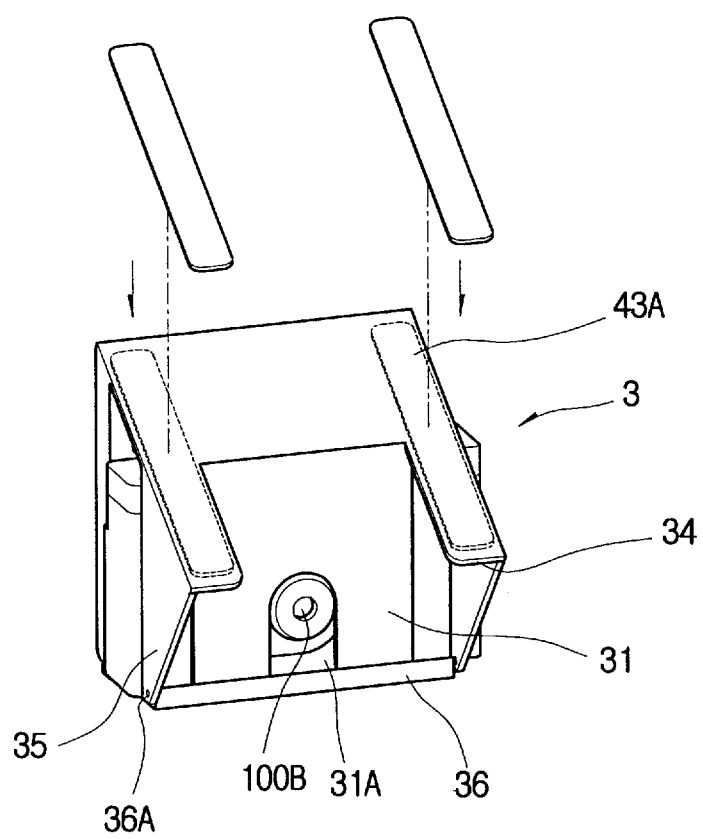

FIG. 14*a* is a front perspective view illustrating construction of the present invention. As can be readily seen from FIG. 14*a*, the traffic accident photographing device according to this embodiment of the present invention comprises the camera 100 and the camera holder 3. The camera 100 is inserted and accommodated in the camera holder 3. The camera holder 3 is attached to the front windshield glass of the vehicle by the medium of the attachment plates 34 to which the double-sided adhesive tapes 43A are adhered. At this time, the attachment plates 34 are integrally formed on the upper surface of and at both sides, respectively, of the front plate 31 in a state wherein they are supported by the vertical support plates 35, respectively. Each attachment plate 34 has an inclination angle corresponding to that of the front windshield glass of the vehicle.

As described above, the rear plate 32 extending in the vertical direction is positioned behind the front plate 31 in a manner such that the camera insertion space 33 having the opening 33A at the lower end thereof is defined between the front and rear plates 31 and 32 to allow the camera 100 to be inserted and accommodated in the camera insertion space 33. The lens exposure opening 31A is defined adjacent to the lower end of the front plate 31 in a manner such that the lens 100B of the camera 100 inserted and accommodated in the camera insertion space 33 can be exposed through the front plate 31.

The opening 33A can be opened and closed by a cover plate 36 in such a way as to prevent the camera 100 inserted and accommodated in the camera insertion space 33 from being released through the opening 33A. One end of the cover plate 36 is coupled by a hinge 36A to lower ends of the vertical support plates 35 supporting the attachment plates 34. Therefore, as the cover plate 36 is rotated about the hinge 36A, the opening 33A of the camera insertion space 33 can be opened and closed.

Figure 14B:
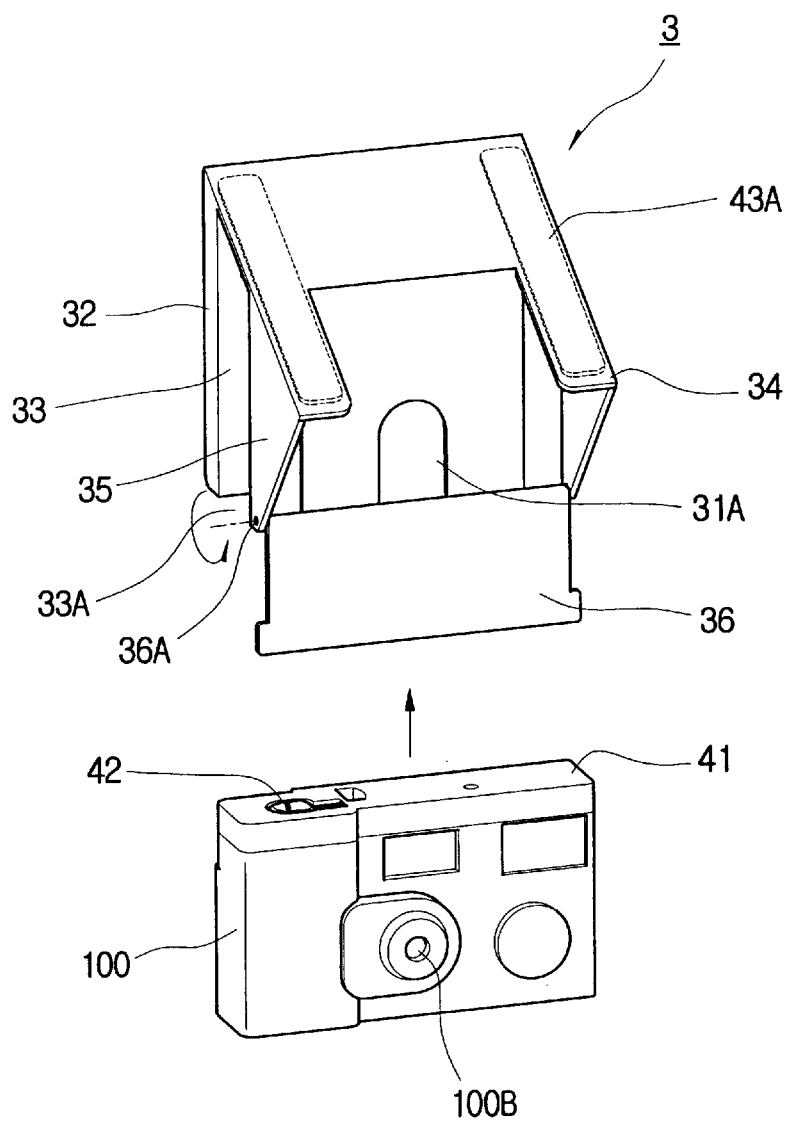

FIG. 14*b* is a front perspective view illustrating a state in which the camera is inserted. As shown in FIG. 14*b*, in the embodiment of the present invention, after the opening 33A of the camera insertion space 33 is opened by unlocking the cover plate 36 which is coupled at one end thereof by the hinge 36A to the vertical support plates 35 for supporting the attachment plates 34, by inserting the camera 100 through the opening 33A, it is possible to insert and accommodate the camera 100 in the camera holder 3.

Figure 15A:
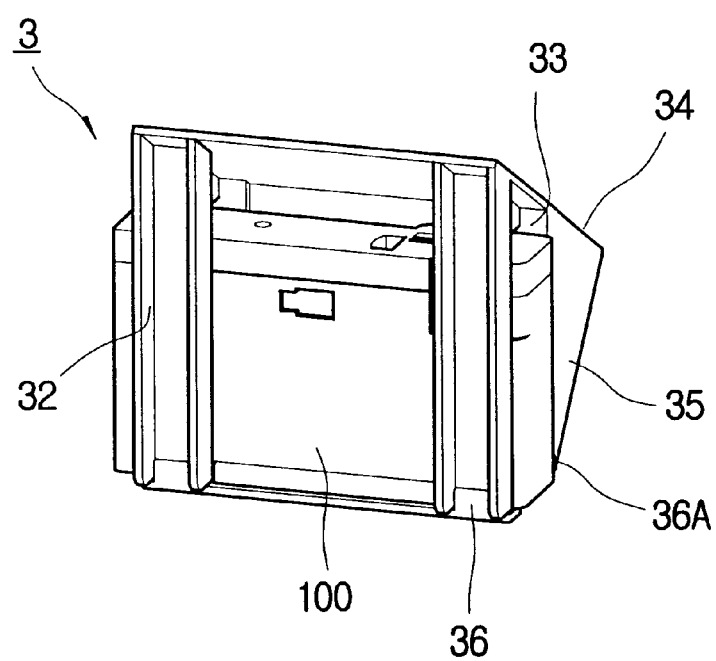
FIG. 15a is a rear perspective view.

FIG. 15a is a rear perspective view illustrating the construction of the present invention. As shown in FIG. 15, in the present invention, as described above, the rear plate 32 extending in the vertical direction is positioned behind the front plate 31 in a manner such that the camera insertion space 33 having the opening 33A at the lower end thereof is defined between the front and rear plates 31 and 32 to allow the camera 100 to be inserted and accommodated in the camera insertion space 33.

Due to the fact that the opening 33A defined at the lower end of the camera insertion space 33 is closed by the cover plate 36 which is coupled at one end thereof by the hinge 36A to the vertical support plates 35 for supporting the attachment plates 34, it is possible to prevent the camera 100 from being released through the opening 33A.

Figure 15B:
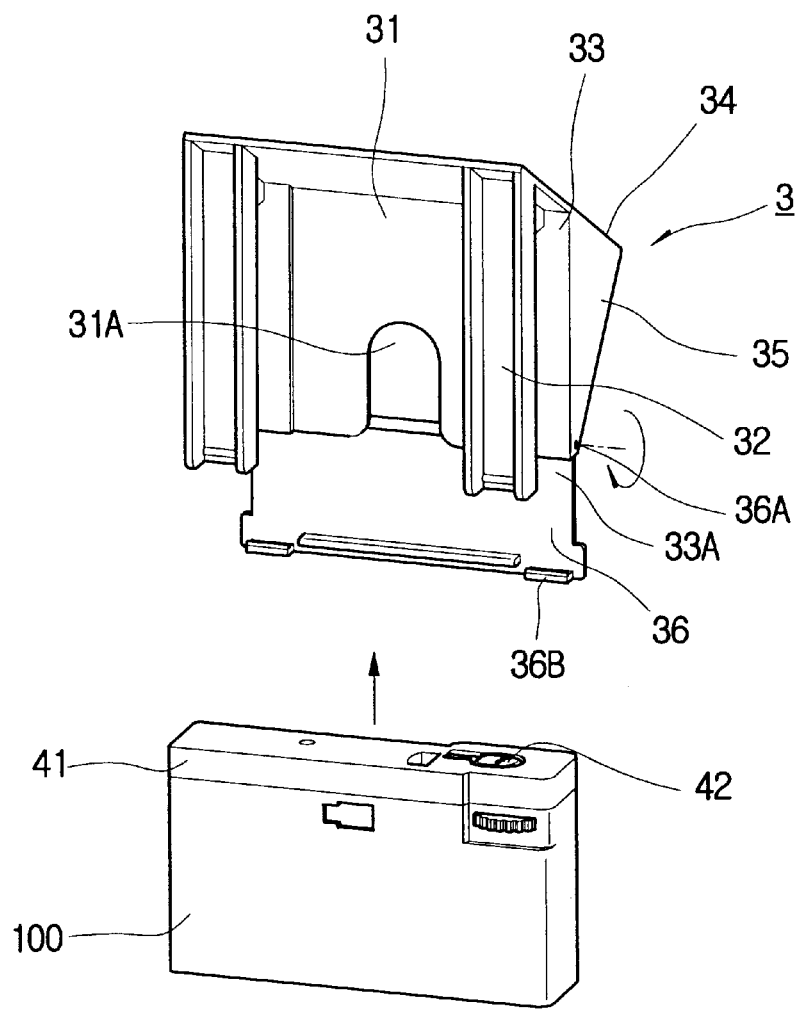
FIG. 15b is a rear perspective view illustrating a state in which the camera is inserted.

FIG. 15b is a rear perspective view illustrating a state in which the camera is inserted. As shown in FIG. 15b, in the present invention, after the opening 33A of the camera insertion space 33 defined between the front and rear plates 31 and 32 is opened by opening the cover plate 36 coupled by the hinge 36A to the vertical support plates 35, the camera 100 can be inserted and accommodated through the opening 33A in the camera insertion space 33.

In this inserted and accommodated state of the camera 100, by rotating the cover plate 36 and engaging a fastening protrusion 36B formed at the other end of the cover plate 36 with an engaging protrusion 32A formed on a rear surface of and adjacent to a lower end of the rear plate 32 to close the opening 33A of the camera insertion space 33, the camera 100 is prevented from being released through the opening 33A.

Figure 16A:
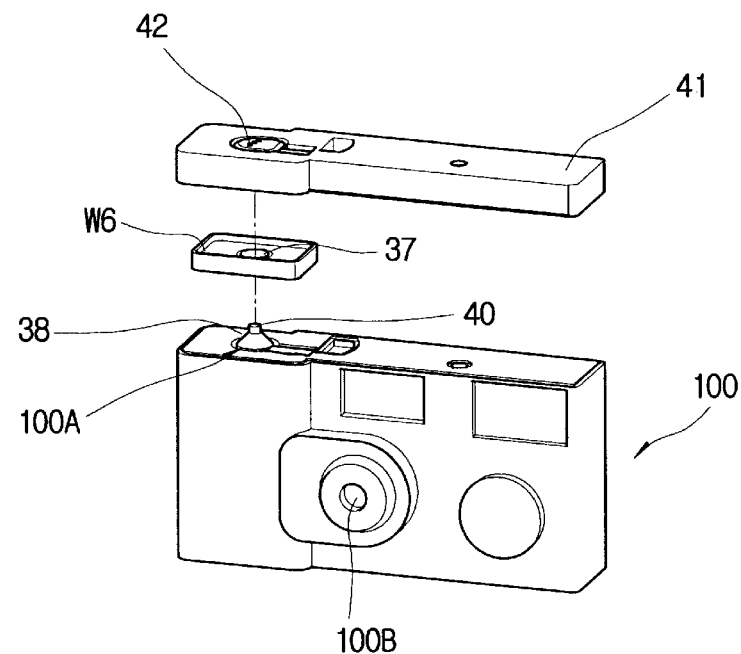
Figure 16B:
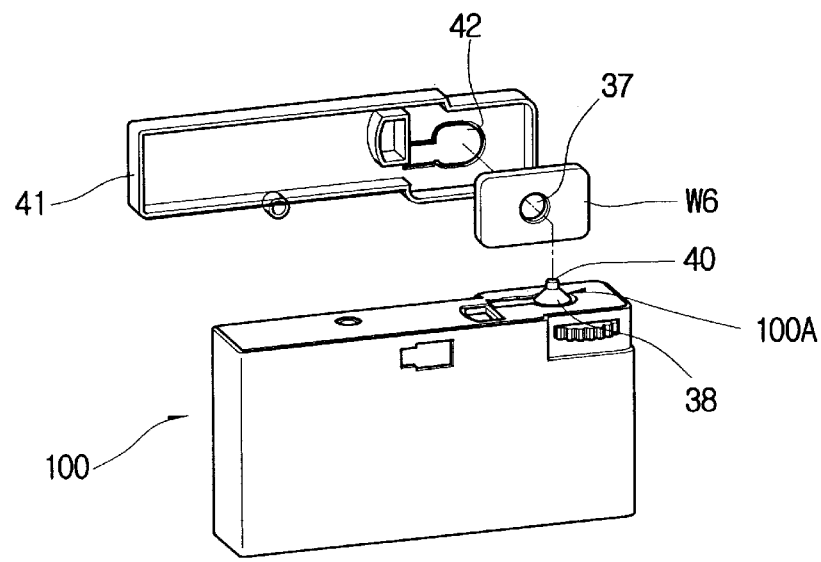
Figure 17A:
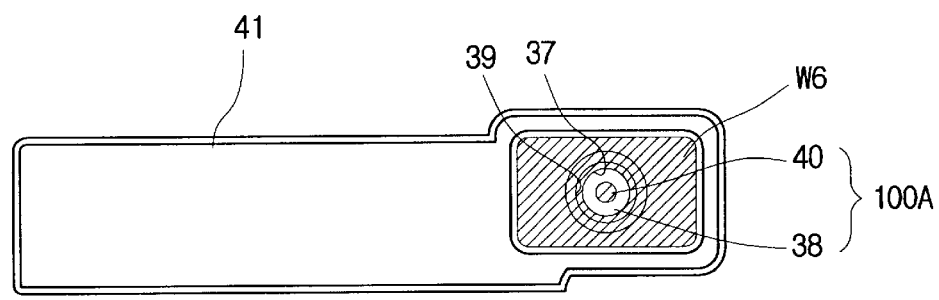
Figure 17B:
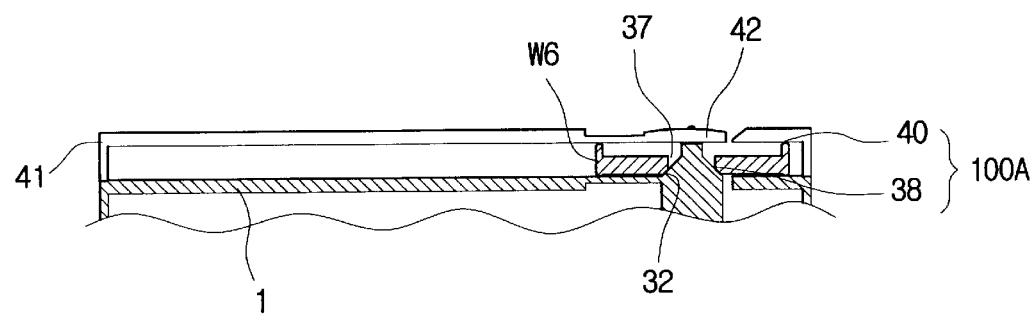

FIGS. 16a and 16b are front and rear exploded perspective views, respectively, illustrating a state in which a weight member of the present invention is positioned in place. As shown in these drawings, in this embodiment, the camera shutter 100A projects out of an upper surface of the camera 100. A weight member W6 which serves as the shutter pressing means and is defined with an insertion hole 37 at a center portion thereof is fitted around the camera shutter 100A. A closure member 41 is placed on the weight member W6. The closure member 41 has a size capable of covering the upper surface of the camera 100 and is opened at a lower end thereof.

The weight member W6 is made of heavy metallic material. Due to this fact, while the vehicle travels as usual, the weight member W6 is held at its original position by its own weight. Then, if a collision occurs, the weight member W6 is moved under action of inertial force. At this time, the camera shutter 100A is formed with a truncated cone-shaped portion 38 to be pressed by the movement of the weight member W6. An inner edge of the weight member W6, defining the insertion hole 37, is formed, adjacent to a lower end thereof, with a contact surface 39 which is flared downward to be brought into contact with the truncated cone-shaped portion 38 of the camera shutter 100A.

In order to ensure that manual photographing work can be conducted in addition to the automatic photographing by the weight member W6 as described above, an upper end of the camera shutter 100A is extended upward to form a contact projection 40. The closure member 41 is formed, at a position aligned with the contact projection 40, with an auxiliary shutter 42 having a predetermined elasticity. The auxiliary shutter 42 is formed by partially cutting a portion of the closure member 41 in such a way as to allow one end of the portion to remain connected to the closure member 41.

Figure 18A:
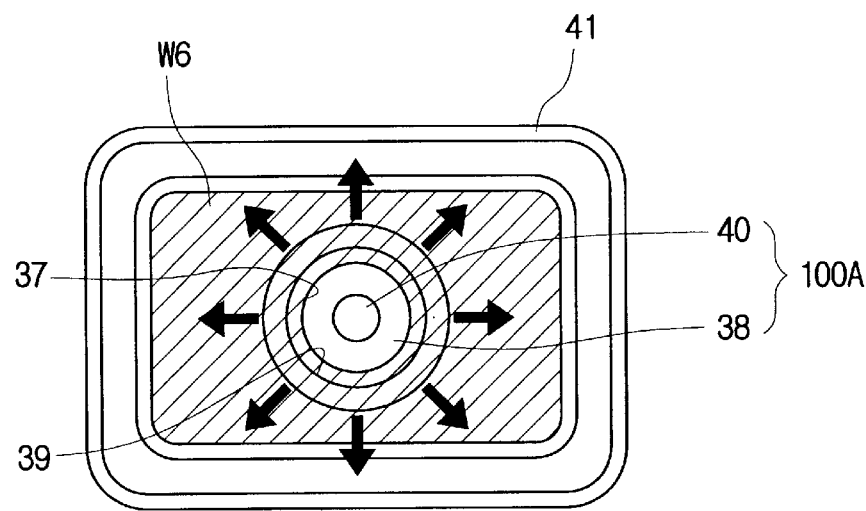
Figure 18B:
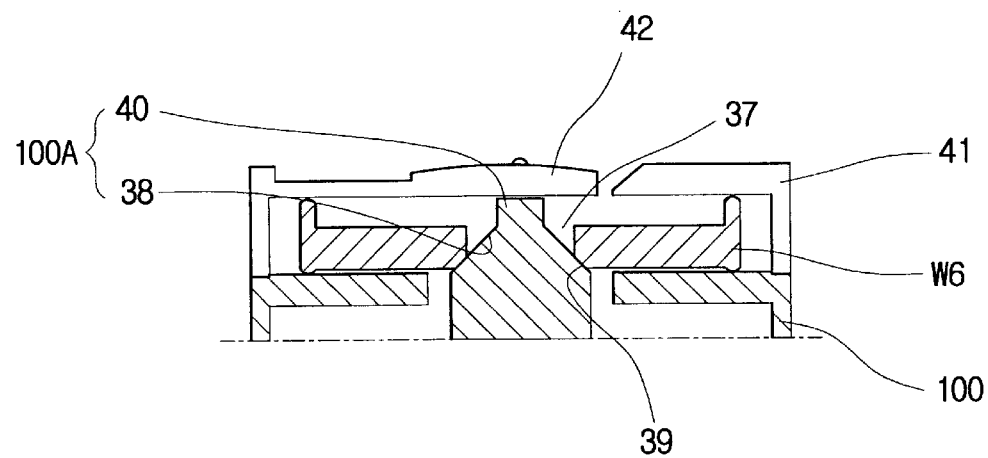
Figure 19A:
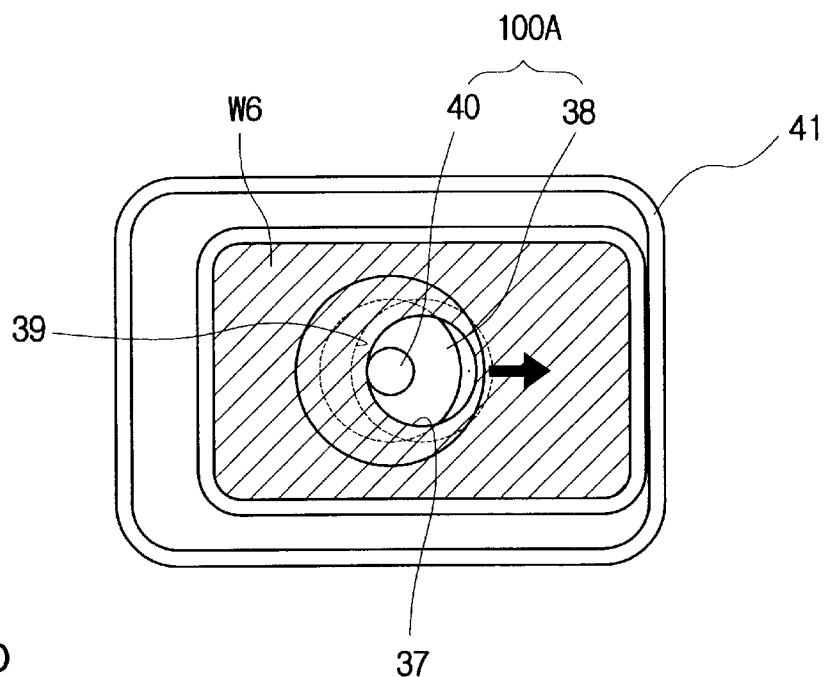
Figure 19B:
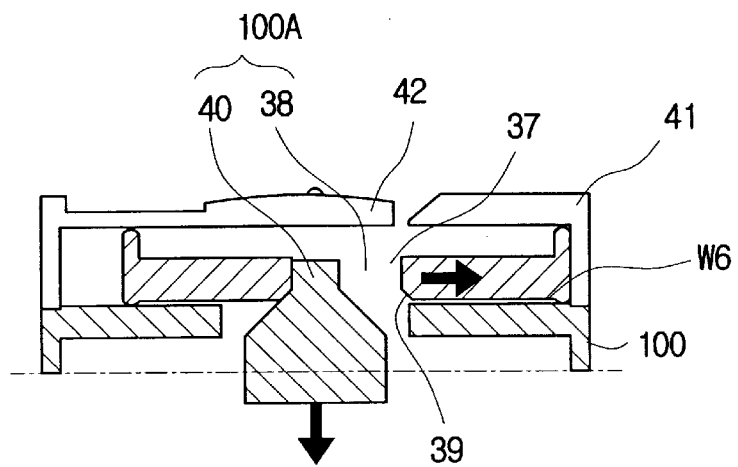

FIGS. 18a through 19b show a state in which the weight member of the present invention is operated. As shown in these drawings, while the vehicle travels as usual, the weight member W6 is held at its original position by its own weight. In this state, if a collision occurs, the weight member W6 is moved under action of inertial force. At this time, in a state wherein the contact surface 39 formed on the inner edge of the weight member W6, defining the insertion hole 37, is positioned adjacent to a lower end of the truncated cone-shaped portion 38 of the camera shutter 100A as shown in FIGS. 18a and 18b, the weight member W6 is moved due to the collision and applies force to the camera shutter 100A. By this force, the truncated cone-shaped portion 38 of the camera shutter 100A is, as shown in FIGS. 19a and 19b, lowered along the contact surface 39 of the weight member W6, whereby the camera shutter 100A is pressed to implement photographing.

If it is necessary to manually conduct photographing work, after removing the camera 100 from the camera holder 3, by manually applying force to the auxiliary shutter 42 of the closure member 41 to press the contact projection 40 of the camera shutter 100A, it is possible to manually conduct photographing in addition to the automatic photographing by the weight member W6.

INDUSTRIAL APPLICABILITY

As apparent from the above description, the traffic accident photographing device for a vehicle according to the present invention provides advantages in that the device, while capable of precisely photographing an actual scene of a collision, has a simple mechanical construction, thus ensuring easy manufacture of the device, securing economic efficiency, and improving operational reliability of the device.

Also, due to the fact that front, rear, left and right sides images of the vehicle can be directed by a reflection mirror toward a lens and photographed by the lens, with a camera fastened to the roof of the vehicle, that is, the lens facing downward, photographing can be executed over a wide range without limitation.

Further, by the fact that a weight member for pressing a shutter of the camera is configured to be freely moved irrespective of direction by action of inertia force, it is possible to photograph an actual scene irrespective of the direction in which a collision occurs.

In addition, in the present invention, because it is possible to precisely photograph a collision only using simple electric circuit parts, constructional simplification can be accomplished, and thereby, the device can be easily manufactured and a manufacturing cost can be reduced.

Moreover, in the present invention, since front, rear, left and right side images of the vehicle can be photographed without requiring an arrangement or component parts for directing the front, rear, left and right side images of the vehicle toward the lens of the camera fastened to the roof of the vehicle, the number of component parts is decreased, whereby the device can be easily installed and a manufacturing cost can be further reduced.

Besides, the device according to the present invention is configured in a manner such that a quantity of light which is incident through the camera lens can be changed in the daytime and nighttime, and thereby, resolution of a photograph taken simultaneously with occurrence of a collision can be kept constant irrespective of day or night.

Furthermore, since the device according to the present invention does not need component parts for fastening the camera to the roof of the vehicle or other separate component parts, the construction of the device is simplified, whereby a volume occupied by the device can be minimized and installation convenience is ensured.

Also, because the device according to the present invention has a simple construction which can be easily manufactured, can be mounted to the vehicle simply by bonding due to its light weight and reduced volume, and can photograph an actual scene simultaneously with occurrence of a collision through a simple mechanical operating procedure, operational preciseness and reliability can be further improved.

Further, by the fact that the device according to the present invention can automatically photograph an actual scene simultaneously with occurrence of a collision and also allows manual photographing work, user convenience is rendered.

What is claimed is:

1. A traffic accident photographing device for a vehicle, comprising:
    camera-fastening means for fastening a camera to the vehicle to allow the camera to photograph an actual scene occurrence of a collision, the camera-fastening means comprising:
        a transparent cover bracket having a reflection mirror at a center portion thereof; and
        a roof bracket bolted to the roof of the vehicle along with the transparent cover bracket;
    a housing coupled to a lower surface of the roof bracket, and defined, at a center portion thereof, with a camera insertion which is opened at an upper end, the housing further defined with a lens exposure opening below the camera insertion space;
    shutter-pressing means for allowing a shutter of the camera fastened to the vehicle by the camera-fastening means, to be pressed, the shutter-pressing means comprising:
        a hole defined through a side wall of the housing;
        a round bar-shaped weight member disposed in the hole through the side wall of the housing;
        a spring for biasing the weight member outward of the hole through the side wall of the housing; and wherein
    upon the collision, the weight member, which is moved by an inertial force generated by the collision, operates the shutter of the camera.

2. The traffic accident photographing device as set forth in claim 1, wherein the reflection mirror is formed by a mirror body having a truncated quadrangular pyramid-shaped contour.

3. The traffic accident photographing device as set forth in claim 1, wherein the reflection mirror is formed by a mirror body having a truncated cone-shaped contour.

4. The traffic accident photographing device as set forth in claim 1, wherein the reflection mirror is formed by a mirror body having a contour of a triangle which is opened at a base thereof and has both sides symmetrized with each other.

5. The traffic accident photographing device as set forth in claim 1, wherein
    the camera comprises a camera body having four side walls; camera lenses are attached to the four side walls, respectively, of the camera body;
    film-supporting surface are continuously formed inward of the camera lenses; and
    a film-supplying roll an a film-winding roll are provided inward of the film-supporting surfaces in a manner such that film can be supplied from the film-supplying roll along the film-supporting surfaces and thereafter wound around the film-winding roll.

6. The traffic accident photographing device as set forth in claim 1, wherein
    the transparent cover having a reflection mirror is positioned in front of a lens of the camera.

7. A traffic accident photographing device for a vehicle, comprising:
    camera-fastening means for fastening a camera to the vehicle to allow the camera to photograph an actual scene upon occurrence of a collision, the camera fastening means comprising:
        a transparent cover bracket having a reflection mirror at a center portion thereof; and
        a roof bracket bolted to the roof of the vehicle along with the transparent cover bracket;
    a housing coupled to a lower surface of the roof bracket, and defined, at a center portion thereof, with a camera insertion space which is opened at an upper end, the housing being further defined with a lens exposure opening below the camera insertion space;
    shutter-pressing means for allowing a shutter of the camera fastened to the vehicle by the camera-fastening means to be pressed, the shutter-pressing means comprising:
        a circular groove defined on a part of an upper surface of the housing;
        a pressing rod-mounting hole defined through a side wall of the housing below the circular groove, to be communicated with the camera insertion space;
        a discus-shaped weight member and a round bar-shaped pressing rod disposed in the circular groove and the pressing rod-mounting hole, respectively, and connected with each other by a rope extending through a connection hole which communicates the circular groove with the pressing rod-mounting hole; and
        a spring for biasing the pressing rod outward of the pressing rod-mounting hole; and wherein
    upon the collision, the weight member, which is moved by an inertial force generated by the collision, operates the shutter of the camera.

8. A traffic accident photographing device for a vehicle, comprising:
    camera-fastening means for fastening a camera to the vehicle to allow the camera to photograph an actual scene upon occurrence of a collision, the camera fastening means comprising:
        a transparent cover bracket having a reflection mirror at a center portion thereof; and
        a roof bracket bolted to the roof of the vehicle along with the transparent cover bracket;
    a housing coupled to a lower surface of the roof bracket, and defined, at a center portion thereof, with a camera insertion space which is opened at an upper end, the housing being further defined with a lens exposure opening below the camera insertion space;
    shutter-pressing means for allowing a shutter of the camera fastened to the vehicle by the camera-fastening means to pressed, the shutter-pressing means comprising:

a rectangular groove defined on a part of an upper surface of the housing;

a receiving groove defined on a part of a bottom surface of the rectangular groove, to be communicated with the camera insertion space;

a rotary pressing member hingedly received in the receiving groove and having a forward projection and an upward projection;

a rectangular weight member disposed in the rectangular groove, and defined, on a lower surface thereof, with an inclined contact surface to be brought into sliding contact with the upward projection of the rotary pressing member, the rectangular weight member comprising first and second lengthwise ends;

a plurality of tension springs, each tension spring having one end connected to one of the first and second lengthwise ends of the rectangular weight member and the other end connected to a side surface of the rectangular groove, wherein an end of at least one of the tension springs is connected to the first lengthwise end of the rectangular weight member and an end of at least one of the other tension springs is connected to the second lengthwise end of the rectangular weight member; and wherein upon the collision, the rectangular weight member, which is moved by an inertial force generated by the collision, operates the shutter of the camera.

9. A traffic accident photographing device for a vehicle, comprising:

camera-fastening means for fastening a camera to the vehicle to allow the camera to photograph an actual scene upon occurrence of a collision;

shutter-pressing means for allowing a shutter of the camera fastened to the vehicle by the camera-fastening means, to be pressed by a weight member which is moved under action of an inertial force generated by the collision wherein the camera comprises:

a camera body d first and second camera lenses installed on a front wall of the camera body; and an iris having first and second iris holes of different diameters is positioned behind the first and second camera lenses.

10. A traffic accident photographing device for a vehicle comprising:

camera-fastening means for fastening a camera to the vehicle to allow the camera to photograph an actual scene upon occurrence of a collision;

shutter-pressing means for allowing a shutter of the camera fastened to the vehicle by the camera-fastening means, to be pressed, the shutter-pressing means comprising:

a weight member defined with an insertion hole at a center portion thereof in a manner such that the weight member can be fitted around the shutter of the camera; and wherein the shutter is formed with a truncated cone-shaped portion, and wherein an inner edge of the weight member, defining the insertion hole, is formed, adjacent to a lower end thereof, with a contact surface which is flared downward, in a manner such that the shutter of the camera can be pressed by the weight member, wherein the shutter is operated by the weight member which is moved under action of an inertial force generated by the collision.

11. The traffic accident photographing device as set forth in claim 10, wherein an upper end of the camera shutter is extended upward to form a contact projection; and a closure member place on the weight member fitted around the camera shutter has an auxiliary shutter which is to e brought into contact with the contact projection and has a predetermined elasticity.

* * * * *